US010523488B2

(12) United States Patent
Lin et al.

(10) Patent No.: US 10,523,488 B2
(45) Date of Patent: Dec. 31, 2019

(54) SYSTEM AND METHOD FOR PERFORMING INITIAL SYNCHRONIZATION DURING WIRELESS SECTOR SEARCHES

(71) Applicant: The Trustees of Princeton University, Princeton, NJ (US)

(72) Inventors: Jia-Chin Lin, Taoyuan (TW); Yu-Ting Sun, Taoyuan (TW); Harold Vincent Poor, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 15/383,588

(22) Filed: Dec. 19, 2016

(65) Prior Publication Data

US 2017/0195158 A1 Jul. 6, 2017

Related U.S. Application Data

(60) Provisional application No. 62/269,224, filed on Dec. 18, 2015.

(51) Int. Cl.
*H04L 27/26* (2006.01)
*H04L 5/00* (2006.01)

(52) U.S. Cl.
CPC ........ *H04L 27/2659* (2013.01); *H04L 5/0032* (2013.01); *H04L 27/2688* (2013.01)

(58) Field of Classification Search
CPC .............. H04L 27/2659; H04L 27/266; H04L 27/2655; H04L 27/2656; H04L 1/1829
USPC ............... 375/260, 267, 343, 350, 354–356
See application file for complete search history.

(56) References Cited

U.S. PATENT DOCUMENTS

| 7,693,129 | B1* | 4/2010 | Kishore | H04L 27/2656 370/210 |
| 9,893,925 | B1* | 2/2018 | Patel | H04L 27/2675 |
| 2004/0062300 | A1* | 4/2004 | McDonough | H04B 1/7077 375/150 |
| 2006/0029017 | A1* | 2/2006 | Mudulodu | H04L 5/0048 370/328 |
| 2007/0183391 | A1* | 8/2007 | Akita | H04L 5/0007 370/350 |
| 2008/0075212 | A1* | 3/2008 | Chun | H04L 7/042 375/354 |
| 2008/0080439 | A1* | 4/2008 | Aziz | H04L 5/0016 370/338 |

(Continued)

OTHER PUBLICATIONS

Tsai, et al., "Cell Search in 3GPP Long-Term Evolution Systems," IEEE Vehicular Technology Magazine, vol. 2, pp. 23-29, Jun. 2007 (7 pages).

(Continued)

*Primary Examiner* — Emmanuel Bayard
(74) *Attorney, Agent, or Firm* — McCarter & English, LLP

(57) ABSTRACT

A system and method for performing initial synchronization during wireless sector searches. The system includes a first subsystem for coarse timing alignment including a decimator to reduce computational complexity and a long-lag differential correlator, a second subsystem for jointly estimating RTE and FFO utilizing a short-lag differential correlator, and a third subsystem for jointly detecting IFO and SID utilizing segmental FD MFs. The system and method of the present disclosure accounts for intercell interference, ICI, and multipath fading with assistance from inherent diversity.

24 Claims, 11 Drawing Sheets

(56) References Cited

U.S. PATENT DOCUMENTS

| | | | |
|---|---|---|---|
| 2009/0067517 A1* | 3/2009 | Hung | H04L 5/0007 375/260 |
| 2009/0135977 A1* | 5/2009 | Sheu | H04L 27/2662 375/371 |
| 2009/0147873 A1* | 6/2009 | Li | H04L 27/2659 375/260 |
| 2009/0156214 A1* | 6/2009 | Lee | H04W 36/30 455/436 |
| 2009/0175394 A1* | 7/2009 | Park | H04L 27/2659 375/362 |
| 2009/0323793 A1* | 12/2009 | Chang | H04B 17/21 375/226 |
| 2010/0029295 A1* | 2/2010 | Touboul | H04J 11/0093 455/456.1 |
| 2010/0040043 A1* | 2/2010 | Li | H04L 27/2656 370/350 |
| 2010/0296611 A1* | 11/2010 | Maltsev | H04B 1/70757 375/343 |
| 2011/0306341 A1* | 12/2011 | Klein | H04B 1/7083 455/434 |
| 2012/0134398 A1* | 5/2012 | Gamage | H04L 27/2666 375/224 |
| 2015/0280849 A1* | 10/2015 | Tsai | H04J 11/0076 370/328 |
| 2016/0218821 A1* | 7/2016 | Adhikary | H04J 11/0069 |
| 2016/0234454 A1* | 8/2016 | Kwon | H04N 5/46 |
| 2016/0270015 A1* | 9/2016 | Lin | H04W 56/0025 |
| 2016/0337105 A1* | 11/2016 | Lawton | H04L 5/0057 |
| 2017/0034798 A1* | 2/2017 | Lin | H04L 5/001 |
| 2017/0093540 A1* | 3/2017 | Lei | H04L 5/0044 |
| 2018/0184390 A1* | 6/2018 | Wu | H04W 4/70 |

OTHER PUBLICATIONS

Chen, et al.. "Symbol Timing Estimation and Sector Detection Algorithm Based on LTE TDD System," in Proc. IEEE International Conference on Network Infrastructure and Digital Content Conference (IC-NIDC 2009), pp. 828-832, Nov. 2009 (5 pages).

Manolakis, et al., "A Closed Concept for Synchronization and Cell Search in 3GPP LTE Systems," in Proc. IEEE Wireless Communications and Networking Conference (WCNC 2009) pp. 1-6, Apr. 2009 (6 page).

Su, et al., "Joint Sector Identity and Integer Part of Carrier Frequency Offset Detection by Phase-Difference in Long Term Evolution Cell Search Process," IET Communications, vol. 7, Iss. 10, pp. 950-959, 2013 (10 pages).

Kim, et al., "Synchronization and Cell-Search Technique Using Preamble for OFDM Cellular Systems," IEEE Transactions on Vehicular Technology, vol. 56, No. 6, pp. 3469-3485, Nov. 2007 (17 pages).

Kim, et al., "SSS Detection Method for Initial Cell Search in 3GPP LTE FDD/TDD Dual Mode Receiver," in Proc. 9th International Symposium Communication and Information Technologies (ISCIT 2009) Sep. 28-30, 2009, pp. 199-203 (5 pages).

Setiawan, et al., "A Low Complexity Physical-Layer Identity Detection for 3GPP Long Term Evolution Systems," in Proc. 12th International Conference on Advanced Communication Technologies (ICACT 2010), Feb. 7-10, 2010, pp. 8-13 (6 pages).

Hao, et al., "An Area-Efficient Implementation of Primary Synchronization Signal Detection in LTE," in Proc. 12th International Conference on Communication Technologies (ICCT 2010), Nov. 11-14, 2010, pp. 722-725 (4 pages).

Yang, et al., "Efficient Implementation of Primary Synchronization Signal Detection in 3GPP LTE Downlink," IET Electronics Letters, vol. 46, No. 5, pp. 376-377, Mar. 2010 (2 pages).

Tsai, et al., "A New Cell Search Scheme in 3GPP Long Term Evolution Downlink OFDMA Systems," in Proc. 12th International Conference on Wireless Communications and Signal Processing (WCSP 2009), Nov. 13-15, 2009, pp. 1-5 (5 pages).

Kim, et al., "An Efficient Synchronization Signal Structure for OFDM-Based Cellular Systems," IEEE Transactions on Wireless Communications, vol. 9, No. 1, pp. 99-105, Jan. 2010 (7 pages).

Golnari, et al., "A Low Complexity Architecture for the Cell Search Applied to the LTE Systems," in Proc. 19th IEEE International Conference on Electronics, Circuits and Systems (ICECS 2012) Dec. 9-12, 2012, pp. 300-303 (4 pages).

Elsherif, et al., "Adaptive Primary Synchronization Signal Detection for 3GPP Long Term Evolution," in Proc. 9th International Wireless Communications and Mobile Computing Conference (IWCMC 2013) Jul. 1-5, 2013, pp. 1716-1721 (6 pages).

Lin, et al., Initial Synchronization Exploiting Inherent Diversity for the LTE Sector Search Process, IEEE Transactions on Wireless Communications., vol. 15, No. 2, pp. 1114-1128, Feb. 2015 (15 pages).

Lin, et al., "Initial Synchronization Assisted from Inherent Diversity on LTE Sector Search Process," in Proc. 2015 IEEE Wireless Communications and Networking Conference (WCNC 2015)—Track 1: PHY and Fundamentals, pp. 311-315, Mar. 2015 (5 pages).

* cited by examiner

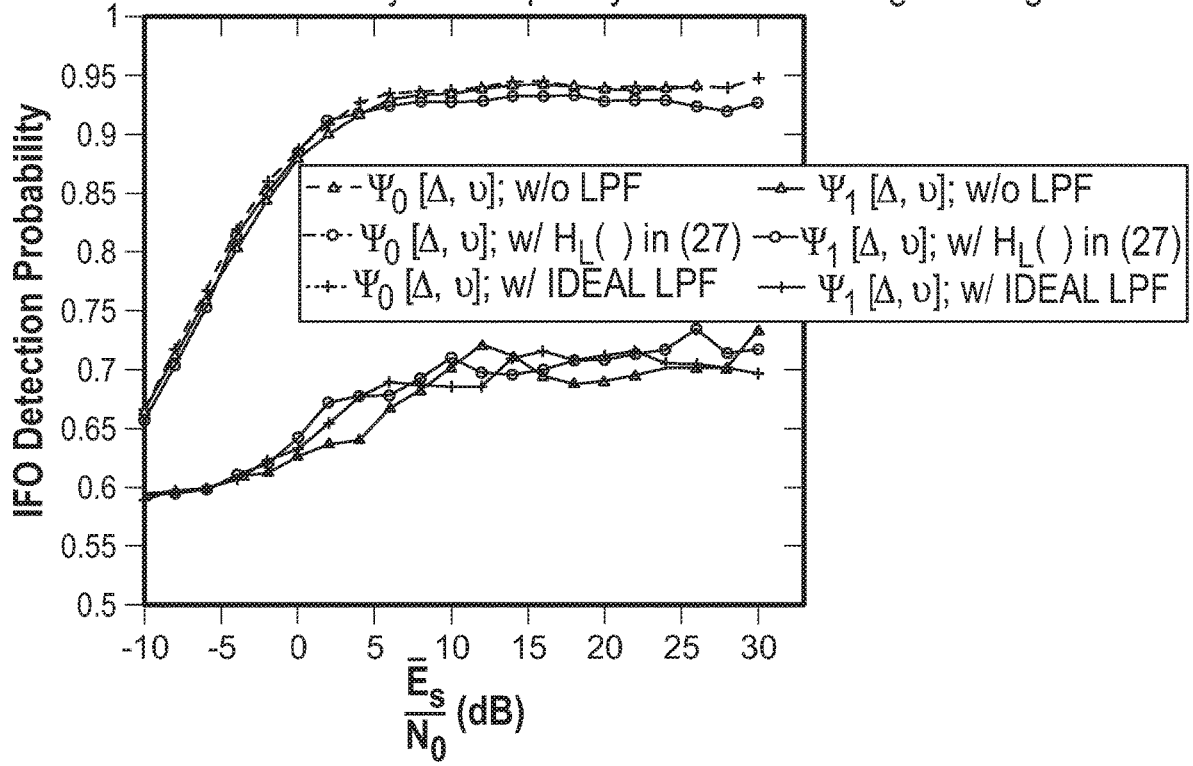
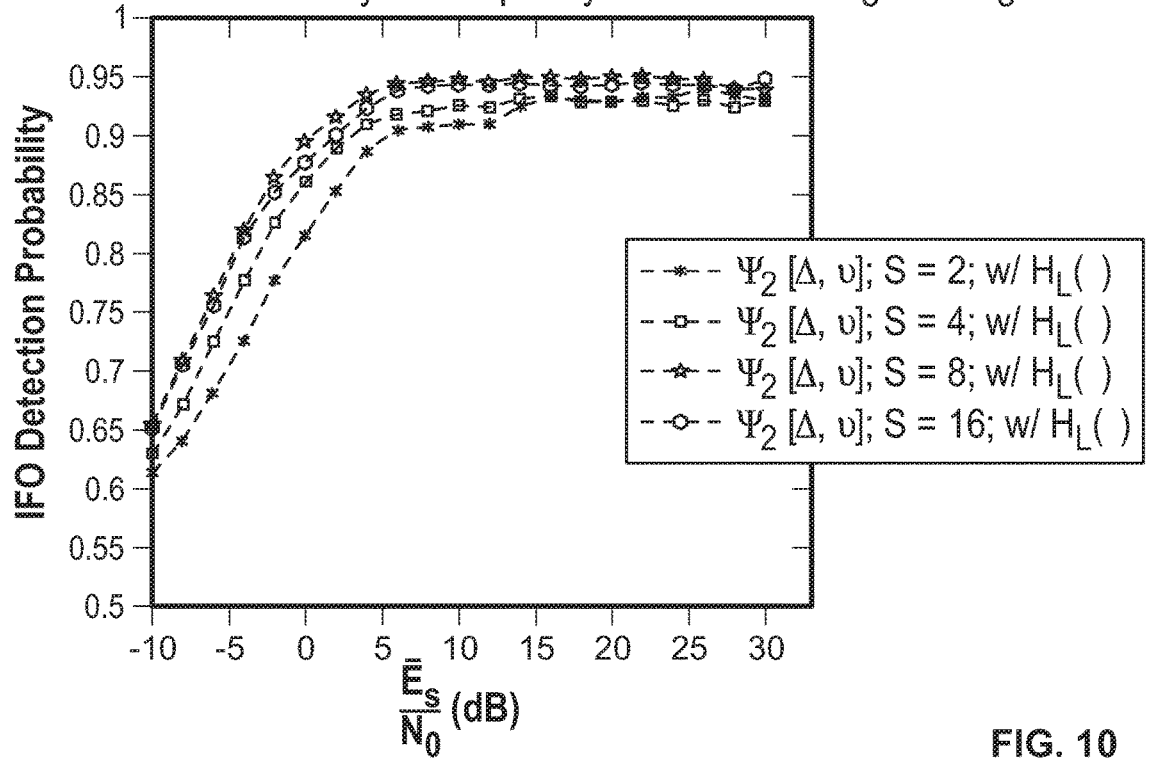
FIG. 10

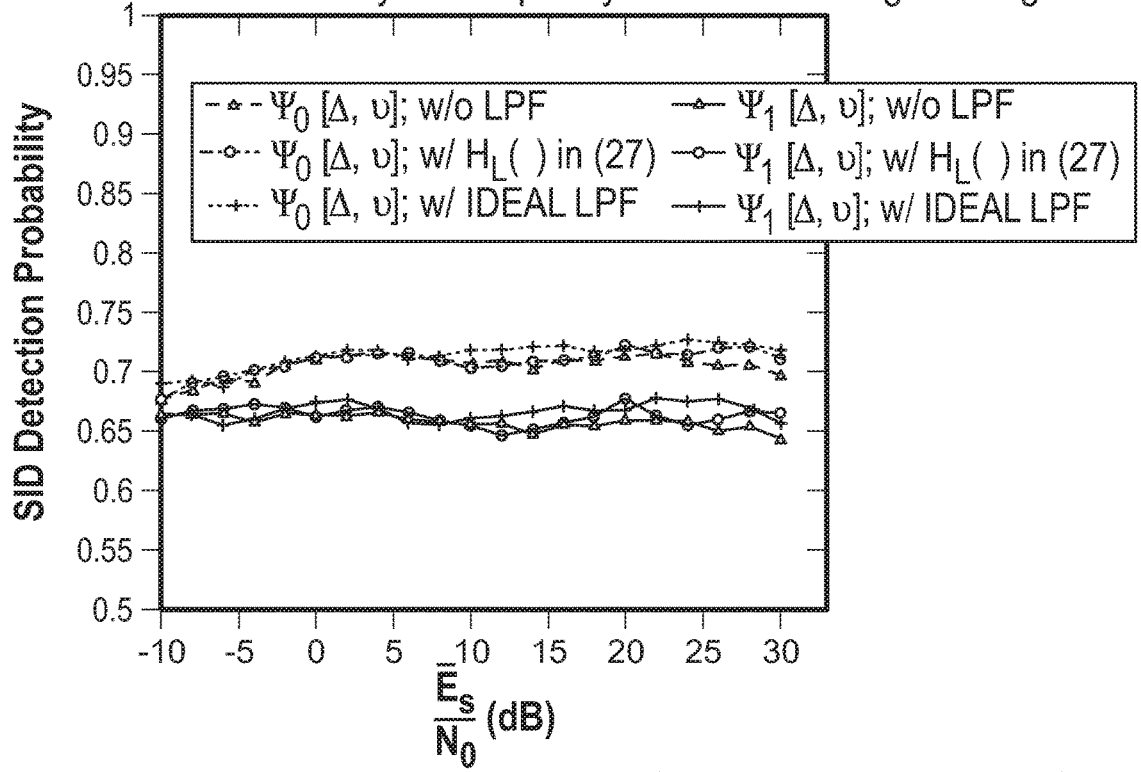
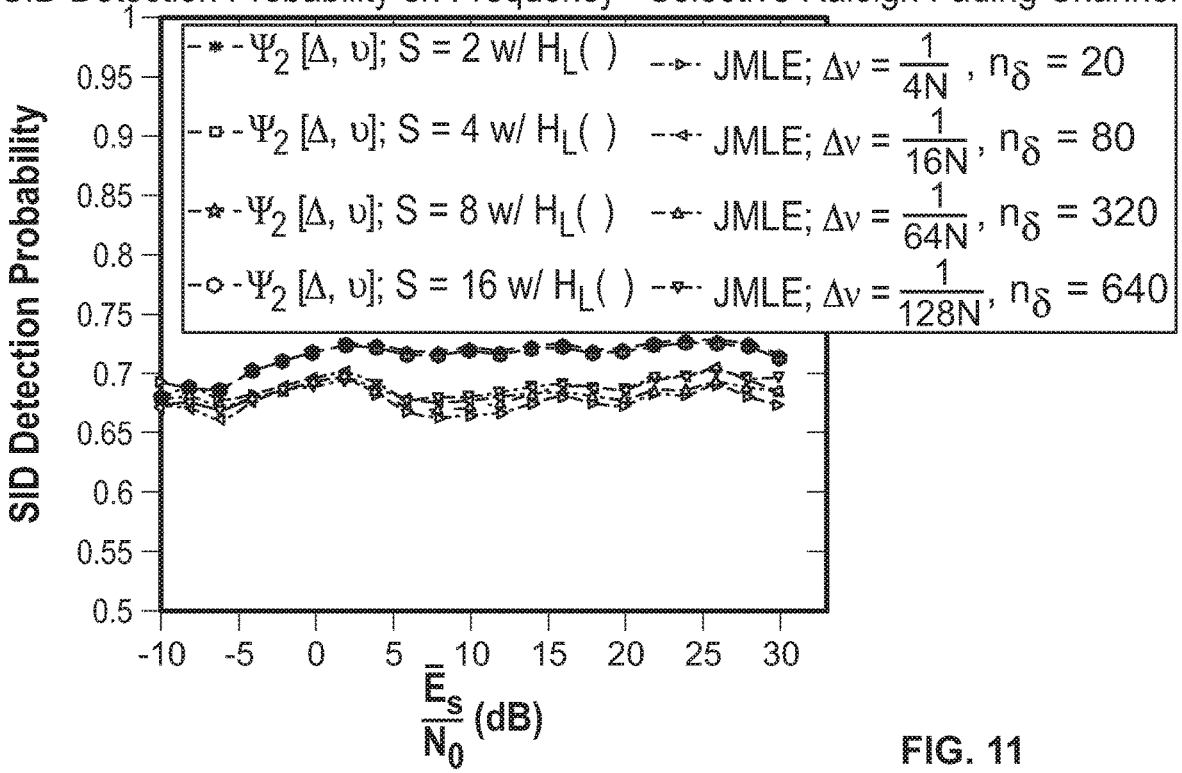
FIG. 11

SYSTEM AND METHOD FOR PERFORMING INITIAL SYNCHRONIZATION DURING WIRELESS SECTOR SEARCHES

CROSS-REFERENCE TO RELATED APPLICATION

This application claims priority to U.S. Provisional Patent Application No. 62/269,224 filed on Dec. 18, 2015, the entire disclosure of the application hereby expressly incorporated by reference.

STATEMENT OF GOVERNMENT INTERESTS

This invention was made with government support under Grant No. CNS-1456793 and No. ECCS-1343210 awarded by the National Science Foundation. The government has certain rights in the invention.

BACKGROUND OF THE INVENTION

Field of the Invention

The present invention relates to wireless communication systems, and more particularly, to a system and method for performing initial synchronization during wireless sector searches.

Related Art

Timing error correction and carrier frequency offset ("CFO") compensation are important for initial synchronization in any wireless communication application. When a mobile station (e.g., smartphone or other cellular device) either turns on or experiences a handover process, the mobile station must search for a base station ("BS") and determine which sector in the BS can provide satisfactory service. This process, called cell search, usually employs the synchronization signals that are transmitted periodically from surrounding BSs. The sector search must be completed first in the cell search process. Specific tasks that are conducted in the sector search of third-generation partnership project ("3GPP") long-term evolution ("LTE") communication systems include (1) coarse timing alignment, (2) estimation of the residual timing error ("RTE") and the fractional frequency offset ("FFO"), (3) integral frequency offset ("IFO") detection, and (4) sector identification ("SID"). In orthogonal-frequency-division-multiplexing ("OFDM") communication, the RTE is a timing error smaller than the length of a normal cyclic prefix ("CP") length; the CFO is often normalized by the subcarrier spacing $\Delta f$, the FFO, whose value is in $(-\frac{1}{2}, \frac{1}{2})$, is the fractional part of the normalized CFO, and the IFO is the integer part of the normalized CFO.

Due to rising interest in carrier aggregation and coordinated multi-point techniques, accurate estimation of the timing error and the CFO upon initial synchronization as a component of the sector search process are of increasing importance. In practice, a mobile station receives signals coming from surrounding BSs. However, current methods of initial synchronization do not take multi-sector reception into account. Moreover, many current methods do not consider multipath reception. In addition, diversity is usually not exploited until after synchronization and channel estimation have been achieved.

For example, the first task conducted in the sector search of 3GPP LTE communication systems employs either autocorrelation of the received signal that is extracted on a fixed lag, or cross-correlation between the received signal and a local primary synchronization sequence ("PSS") for coarse timing alignment between the received signal and the local reference.

The autocorrelation technique often exploits a differential correlator to search for the location of the PSS using the periodic occurrence of PSS signals. The CFO can be estimated by exploiting the phase at the output of the differential correlator. However, the differential correlator can only be applied to timing error estimation and cannot be applied to CFO estimation because two identical PSSs are far apart, i.e., one half of an LTE frame, so that the range of a CFO estimator based on the arctan(•) function becomes too narrow and impractical. Thus, current methods employing the autocorrelation technique only work for CFO estimation when the differential correlation is evaluated on two contiguous sequences in which a very limited CFO occurs. Furthermore, the differential correlator does not work well in environments with low signal-to-noise ratios ("SNRs") because it creates two noise×signal terms and one noise× noise term. Therefore, the differential correlator suffers from significant noise and unavoidable interference.

The cross-correlation technique often jointly estimates the timing error and the CFO by exploiting a pseudo-noise ("PN") matched filter ("MF"). Although this technique may have better SNR performance than the autocorrelation technique based on the differential correlator, it suffers from the accumulation of undesired phase increments for a non-negligible CFO. Further, employing multi-sector reception increases the complexity of the MF technique by at least a factor of three because the MFs must individually match the three possible PSSs conveyed in the received signal.

The second task conducted in the sector search is to estimate the FFO and the RTE. Current methods can employ an estimator that is similar to a joint maximum-likelihood ("ML") estimator. These methods can also employ averaging across a few OFDM symbols in the estimation of the CFO. However, because of the phase wrapping problem, these methods can only deal with the FFO. In order to overcome this limitation, some methods determine the IFO by means of the secondary synchronization sequence ("SSS") in the frequency domain ("FD").

For example, according to some methods, it is difficult to directly apply the ML estimation approach to CFO estimation by using two neighboring PSSs because the PSSs are too far apart so that the range of a CFO estimator based on the arctan(•) function becomes too narrow and impractical. Upon PSS acquisition, the CFO can actually be as high as $\pm 3\Delta f$.

For the third and fourth tasks (IFO detection and SID, respectively), some methods have determined the IFO by means of the PSS in the FD. However, the IFO determination methods suffer from severe inter-carrier interference ("ICI") if a non-negligible FFO is present.

Accordingly, what would be desirable, but has not yet been provided, is a system and method for performing initial synchronization during wireless sector searches, which addresses the foregoing shortcomings of existing initial synchronization approaches.

SUMMARY OF THE INVENTION

A system and method for performing initial synchronization during wireless sector searches is provided. The present disclosure provides an initial synchronization process during the sector search process in third-generation partnership project (3GPP) long-term evolution (LTE) communications. The present disclosure includes three subsystems for providing coarse timing alignment, joint estimation of residual timing error and fractional frequency offset, and joint detection of integral frequency offset and sector identification, and can account for intercell interference, inter-carrier interference and multipath fading with assistance from inherent diversity. Outage and detection probabilities can be derived by taking multi-sector diversity into account in coarse timing alignment. A long-lag differential correlator can achieve signal-to-noise ratio gains in the primary synchronization sequence acquisition probability. Joint estimation of the residual timing error and the fractional frequency offset can be achieved by evaluating the short-lag autocorrelation at an orthogonal frequency division multiplexing (OFDM) symbol duration. Mean-square errors obtained via simulations can be compared with modified Cramér-Rao lower bounds. Joint detection of integral frequency offset and sector identification is accomplished by exploiting a frequency-domain matched filter to account for frequency selectivity. According to some aspects of the present disclosure, differential detection on a segmental frequency-domain matched filter is applied in frequency-selective environments.

BRIEF DESCRIPTION OF THE DRAWINGS

The foregoing features of the invention will be apparent from the following Detailed Description of the Invention, taken in connection with the accompanying drawings, in which:

FIGS. 5-11 are graphs showing performance results of the present invention during software simulation testing.

DETAILED DESCRIPTION OF THE INVENTION

The present disclosure relates to a system and method for performing initial synchronization during wireless sector searches, including a first subsystem for coarse timing alignment including a decimator to reduce computational complexity and a long-lag differential correlator, a second subsystem for jointly estimating RTE and FFO utilizing a short-lag differential correlator, and a third subsystem for jointly detecting IFO and SID utilizing segmental FD MFs. Unlike the methods described above, the system and method of the present disclosure takes intercell interference, ICI, and multipath fading into consideration with assistance from inherent diversity. A mobile station implementing the system and method of the present disclosure exhibits enhanced coverage, lower outage probability, rapid initial synchronization, and rapid handover. These benefits are particularly evident at corners, or on edges, between cells, e.g., areas of strong intercell interference and low SNRs.

Figure 1:
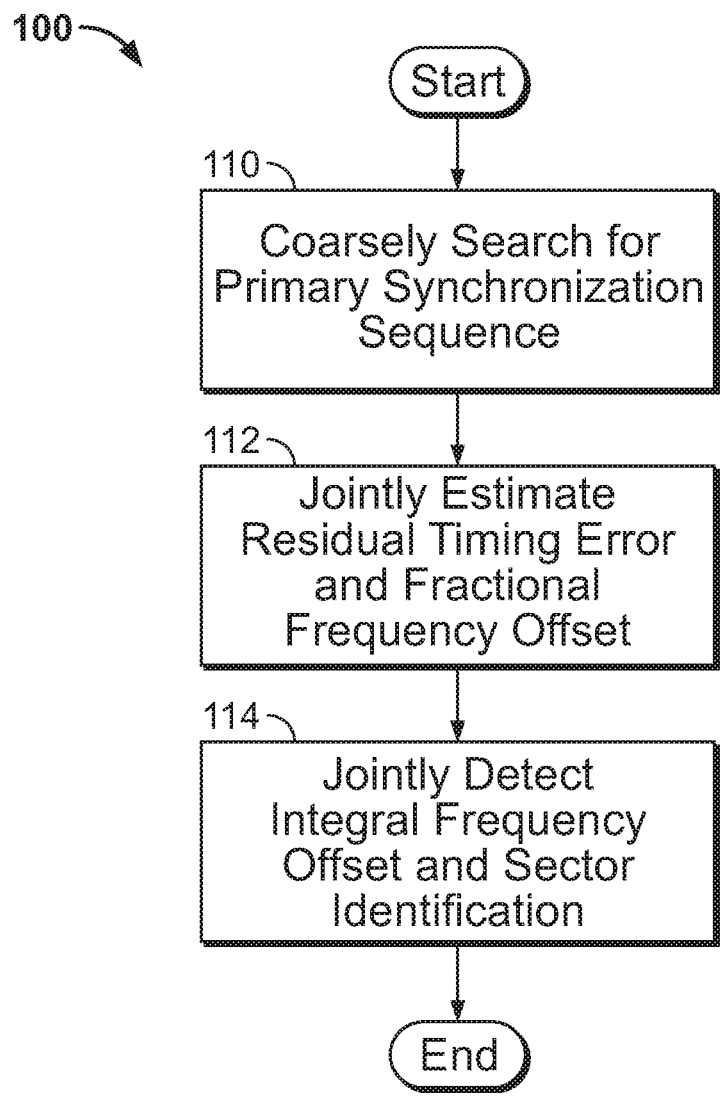
FIG. 1 is a flowchart illustrating processing steps according to the present disclosure for performing initial synchronization in a wireless communication system.

FIG. 1 is a flowchart illustrating processing steps according to the present disclosure for performing initial synchronization in a wireless communication (e.g., LTE or LTE-A) system, indicated generally at 100. It is noted that the systems and methods of the present disclosure could also be implemented in wireless communication systems that implement other, or future, communication standards, such as fifth-generation ("5G") wireless standards. The steps shown in FIG. 1 can be programmed into any suitable mobile station (e.g., smartphone or other cellular device) or the like and executed by a processor (e.g., a digital signal processor ("DSP"), microprocessor, microcontroller, Field-programmable Gate Array ("FPGA"), application-specific integrated circuit ("ASIC"), etc.). In step 110, the system 100 coarsely searches for the primary synchronization sequence. The system 100 first extracts the long-lag autocorrelation between the received signal and its half-frame-delayed replica via a differential correlator to coarsely search for the PSS location for conducting OFDM frame synchronization. A differential correlator follows a first-order infinite-impulse-response ("IIR") lowpass filter ("LPF") and a down-sampler. The system 100 can utilize multi-sector diversity to improve detection probability by approximately 4.7 dB in SNR. After the coarse PSS location is obtained, the frame structure can be roughly delineated and the system 100 proceeds to step 112, where the RTE and the FFO can be jointly estimated to achieve OFDM symbol synchronization by exploiting the short-lag autocorrelation extracted from the CPs. Averaging over 70 CPs effectively reduces the interference and noise coming from beyond the PSS band, and also exploits the time diversity that exists due to channel variations over time. Accordingly, the system 100 exhibits a 6.9-dB improvement in SNR compared with methods assisted only from the PSS. The modified Cramér-Rao lower bounds ("MCRLBs") of the joint estimation of the RTE and the FFO are then derived. After the FFO is compensated for in step 112, the system 100 proceeds to step 114, where the IFO and SID are jointly detected by utilizing a subcarrier-level differentially coherent detection method in the FD. The system 100 performs PSS acquisition in the FD with reduced ICI due to the FFO compensation and can exploit the inherent frequency diversity with a segmental FD MF. The system 100 achieves high IFO and SID detection probabilities with assistance from the FFO compensation prior to their joint detection and the segmental FD MF.

As described above, when a mobile station turns on, or experiences a handover process, the mobile station must search for a BS and determine which sector in the BS can provide satisfactory service. This process utilizes synchronization signals that are transmitted from surrounding BSs. Accordingly, the frame structure of an LTE communication system is described hereinbelow.

One frame on an LTE downlink transmission spans 10 ms. Each frame consists of ten 1-ms subframes. Each subframe is composed of two 0.5-ms slots. Each slot consists of 7 OFDM symbols, with N=2048 samples each, 160 CP samples prefixed to the first symbol and 144 CP samples prefixed to each of the remaining six symbols. The occupied bandwidth is 20 MHz, the sampling rate is $$f_s = \frac{1}{\tau_s} = 30.72 \text{ MHz},$$

the sampling period is $T_s$=32.552 ns, the fast Fourier transform ("FFT") size is N, the subcarrier spacing is $$\Delta f = \frac{1}{\tau} = 15 \text{ kHz},$$

and the FFT window spans $T=NT_s$. Only the central $M_{SS}=72$ subcarriers of all 2043 subcarriers are used to accommodate the synchronization signals. In both boundaries of the band that accommodates the synchronization signals, there are five null subcarriers serving as guard bands that limit the CFO tolerance. The synchronization signals are inserted in $M_2=62$ active subcarriers that are indexed as $N-M_1$, $N-M_1+1, \ldots, N-1, 1, 2, \ldots, M_1$ and $M_1=31$. Because LTE communication adopts a carrier frequency of $f_c=2$ GHz and the oscillator instability tolerance at a mobile station is up to $\pm 20$ ppm of $f_c$, the worst-case CFO is evaluated to be $\rho=40$ kHz. The normalized CFO can be expressed as $$\varepsilon_T = \frac{\rho}{\Delta f} = \varepsilon_I + \varepsilon_F.$$

In the worst case, the normalized CFO is $\varepsilon_T=\pm 2.6667$, the IFO is $\varepsilon_I=\pm 3$, and the FFO is $\varepsilon_F=\mp 0.3333$.

An LTE communication network can support 504 different cell identifications ("CIDs"). These CIDs are categorized into 163 CID groups ("CIDGs"), which are indexed as $V \in \{0, 1, \ldots, 167\}$. Each CIDG consists of three SIDs, which are indexed as $v \in \{0, 1, 2\}$, each for a sector. Therefore, a CID can be determined completely by $N_{CID}=3V+v$. The PSS and SSS are arranged in the two last OFDM symbols in the first slots of subframes 0 and 5. The PSS signalling is the same in both slots, thus providing a coarse timing reference for frame delineation. The PSS signalling in the time domain ("TD") is obtained by taking the inverse FFT ("IFFT") of one of three candidate Zadoff-Chu ("ZC") sequences. Each root index $u_{rt}[v]$ of the family of ZC sequences represents an SID $v$; i.e., $u_{rt}[v]=25, 29$, and 34 for $v=0, 1$ and 2, respectively. The subcarriers are modulated by the employed ZC sequence using the following mapping relation:

$$P_v[n] = \begin{cases} e^{\left(\frac{-j\pi u_{rt}[v](n+31)(n+32)}{63}\right)}, & n = 1, 2, \ldots, M_1, \\ e^{\left(\frac{-j\pi u_{rt}[v](n-N+31)(n-N+32)}{63}\right)}, & n = N-M_1, \ldots, N-1, \\ 0, & \text{elsewhere.} \end{cases} \quad (1)$$

where n is the subcarrier index. The TD PSS can be expressed as $$p_v[k] = \frac{1}{\sqrt{M_z}} \sum_{n=0}^{N-1} P_v[n] e^{j2\pi \frac{nk}{N}}, k = 0, 1, \ldots, N-1.$$

Figure 4:
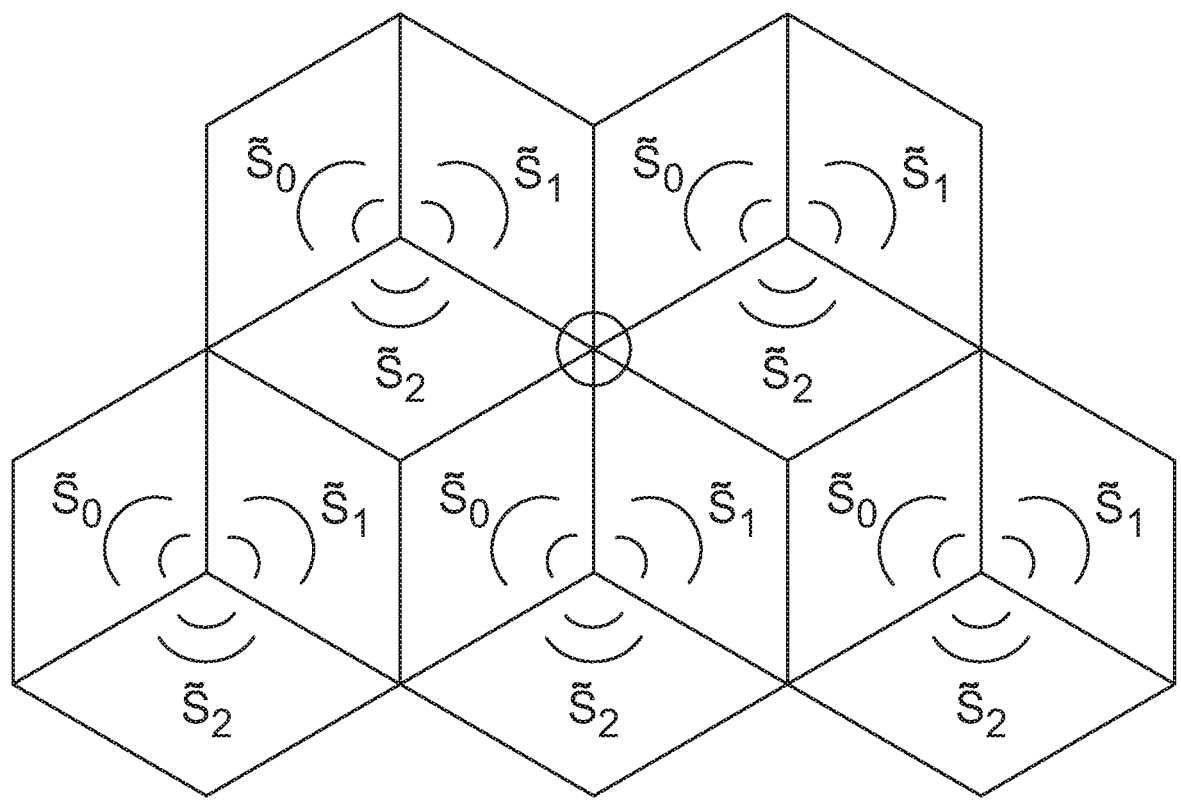
FIG. 4 is a diagram illustrating the cellular structure and SID assignment of received signals according to the present disclosure.

FIG. 4 is a diagram illustrating the cellular structure and SID assignment of received signals of a mobile station according to the present disclosure. A sample complex baseband equivalent signal is employed hereafter. At a BS, the PSS $p_v[k]$ is fed into a transmit filter $g(t)$ with a null-to-null bandwidth $$B_0 = \frac{1}{T_s},$$

and the resulting signal $\tilde{s}_v(t)$ then propagates through a channel. The transmit filter $g(t)$ can be in the form of a square-root raised cosine filter or even an ideal LPF $$g(t) = \frac{1}{\tau_s} \text{sinc}\left(\frac{t}{\tau_s}\right).$$

Considering the cellular structure depicted in FIG. 4, a mobile station at any location receives signals that are transmitted from several surrounding cells. The components of the received signal can be categorized into three kinds: $\tilde{s}_0(\cdot)$, $\tilde{s}_1(\cdot)$ and $\tilde{s}_2(\cdot)$. Therefore, the received signal at a mobile station can be expressed as $$r(t) = \sum_{v=0}^{2} \alpha'_v \tilde{s}_v(t-\tau) \exp(j(2\pi\rho t + \phi_v)) + \tilde{w}(t) \quad (2)$$
$$= \exp(j2\pi\rho t) \sum_{v=0}^{2} \alpha_v \tilde{s}_v(t-\tau) + \tilde{w}(t),$$

where $\rho$ and $\phi_v$ are the CFO in Hz and the initial phase error that unavoidably occur in the front-end noncoherent down-conversion process, respectively; $\tau$ is the timing error; $\alpha'_v$ is a channel weight that models signal attenuation and fading occurring with the signals from surrounding sectors indexed $v$; and $\tilde{w}(t)$ is additive white Gaussian noise ("AWGN") with power spectral density ("PSD") $N_0$ W/Hz. In accordance with the central limit theorem ("CLT"), $\alpha'_v$ usually can be modeled as a zero-mean circularly symmetric complex Gaussian random variable ("RV") for Rayleigh fading because any component $\tilde{s}_v(\cdot)$, $v=0, 1, 2$ is composed of signals that are transmitted from several surrounding BSs and then reflected by many objects surrounding the mobile station. Furthermore, $\alpha_v = \alpha'_v \exp(j\phi_v)$, $\tilde{s}_v(t) = A\sum_{k=0}^{N-1} p_v[k] g(t-kT_s)$, $$A = \sqrt{\frac{E_s}{\tau_s}},$$

and $E_s$ is the energy per sample. Only frequency-flat Rayleigh fading is considered in equation (2) because the multipath components are unresolvable compared with the reciprocal of the processing rate at the first subsystem. In equation (2), different sectors provide signals corrupted by independent channel weights and different initial phase errors, but a common CFO $\rho$ and a common timing error $\tau$. The differences among the timing errors occurring in the PSS signals from different cells are negligible, and their effects can be taken into account by the initial phase errors $\phi_v$, $v=0, 1, 2$, because the carrier frequency $f_c$ is usually very high. Then $e^{j\phi_v}$, $v=0, 1, 2$, are taken care of in $\alpha_v$, $v=0, 1, 2$, as presented in equation (2). The frequency differences among neighboring sectors are negligible compared with the CFO occurring at the local oscillator of the mobile station. This consideration is also practical when the following two facts are taken into account. First, all neighboring BSs are connected to a master clock by satellite or optical fiber links. Second, local oscillators operating at the BSs are usually of high accuracy by commonly using oven controlled crystal oscillators so that the carrier frequencies of neighboring BSs vary insignificantly. As a result, the CFOs are dominantly owing to the instability of the local oscillator at the given mobile station. Therefore, the CFOs can be considered to have a common value for an individual mobile station.

Figure 2:
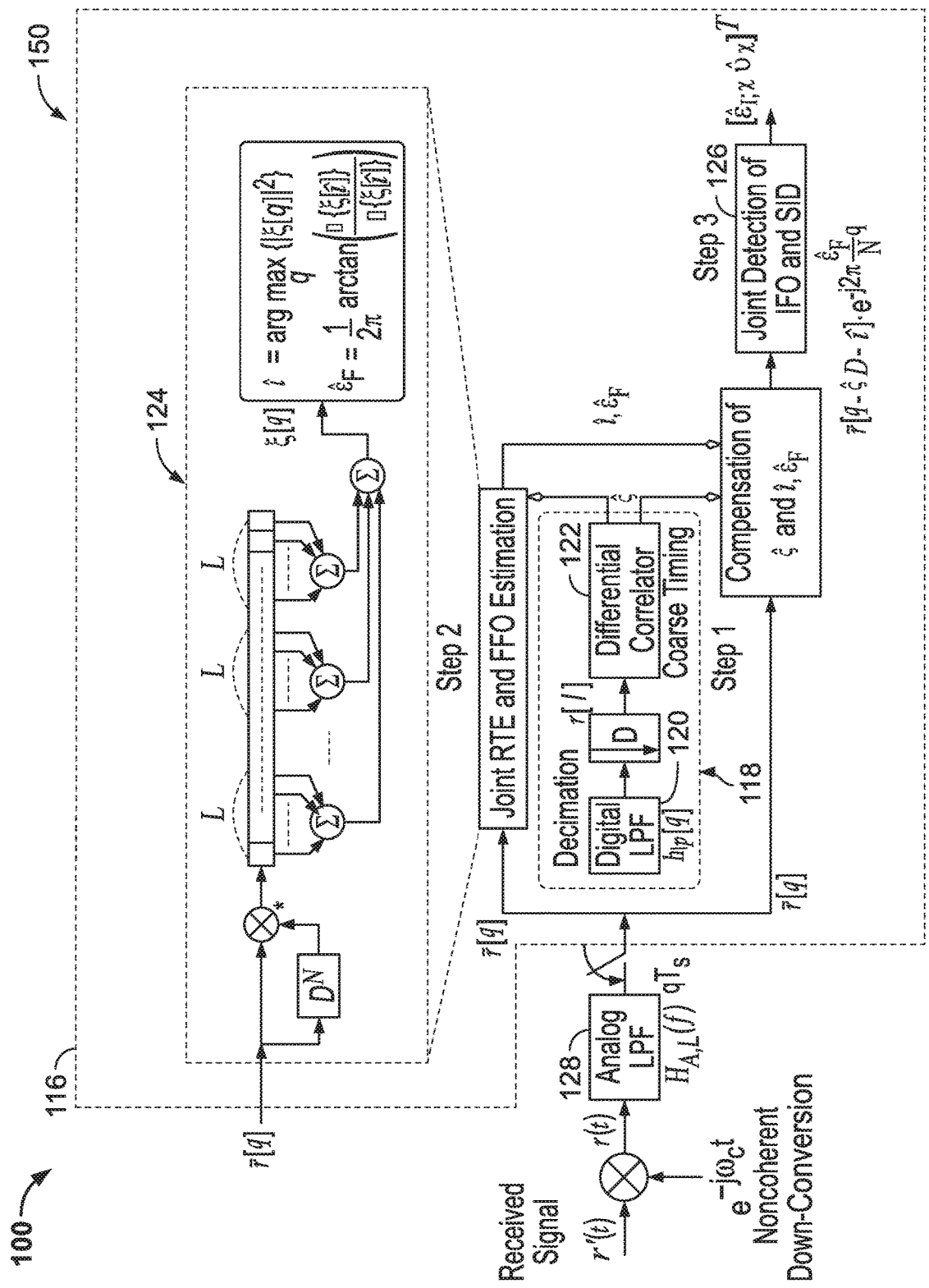
FIG. 2 is a block diagram illustrating a sample hardware and software/firmware arrangement for implementing the system of the present disclosure.

FIG. 2 is a block diagram illustrating a sample hardware and software/firmware configuration for implementing the system 100 of the present disclosure, indicated generally at 150. As shown in FIG. 2, the hardware configuration 150 can include a processor 116 (e.g., a digital signal processor ("DSP"), microprocessor, microcontroller, Field-programmable Gate Array ("FPGA"), application-specific integrated circuit ("ASIC"), etc.), indicated by dashed lines 116, having a first subsystem 118, a second subsystem 124, and a third subsystem 126. The first subsystem 118 could include a digital low-pass filter 120 and a differential correlator 122. The hardware arrangement 150 could also include an analog low-pass filter 128. With continuing reference to FIG. 2, the received signal is fed into a noncoherent down-conversion process and then into the analog LPF 128 with transfer function $$H_{A,L}(f) = \Pi\left(\frac{f}{B_0}\right).$$

The received signal is sampled at rate $$B_0 = \frac{1}{\tau_s}$$

to generate the sample stream $$\tilde{r}[q] = r(qT_s) = e^{j2\pi\rho qT_s}\Sigma_{\nu=0}^2 \alpha_\nu \tilde{s}_\nu(qT_s-\tau) + \tilde{w}[q], \quad (3)$$

where the variance of the noise $\tilde{w}[q]$ is $$\sigma_{\tilde{w}}^2 = N_0 B_0 = \frac{N_0}{\tau_s}.$$

For simplicity, the transmit and receive filters are both set to be ideal LPFs without loss of generality. These filters can be substituted by any filters that obey the Nyquist pulse shaping criterion.

Figure 3:
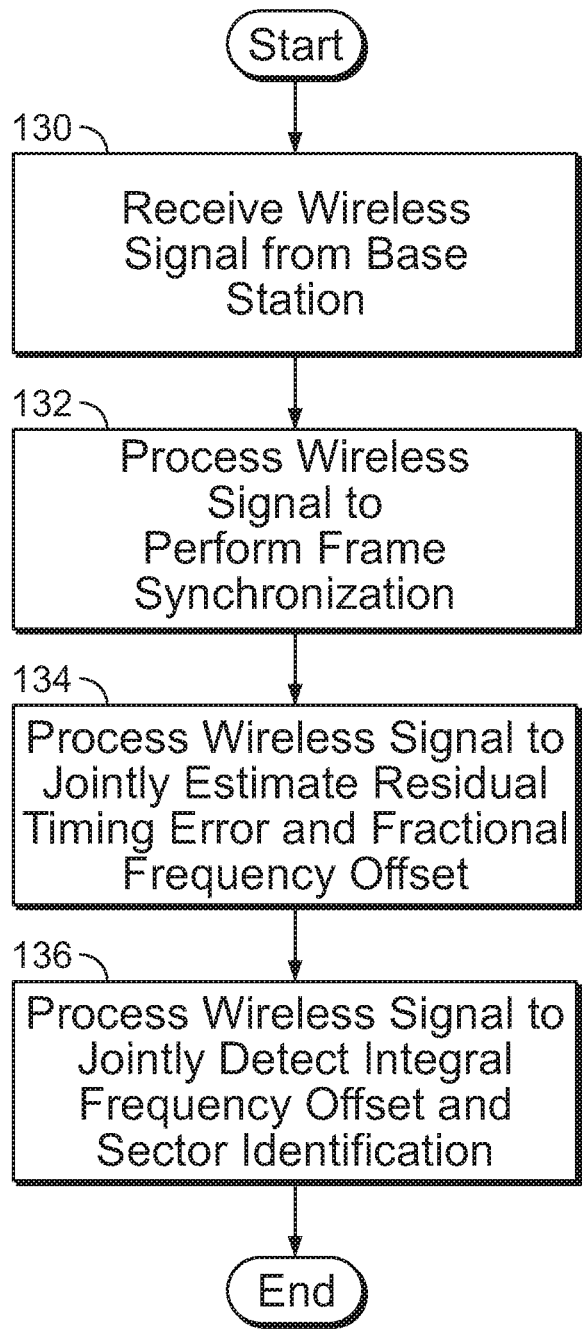
FIG. 3 is a flowchart illustrating processing steps carried out by the sample hardware and software/firmware arrangement of FIG. 2.

FIG. 3 is a flowchart illustrating processing steps according to the present disclosure for performing initial synchronization in wireless communication system 100. The steps shown in FIG. 3 can be programmed into and/or implemented by the hardware configuration 150 of FIG. 2, or any suitable mobile station (e.g., smartphone, other cellular device, etc.) or the like having a suitable processor (e.g., a digital signal processor ("DSP"), microprocessor, microcontroller, Field-programmable Gate Array ("FPGA"), application-specific integrated circuit ("ASIC"), etc.). As shown in FIG. 3, the system 100 of the present disclosure begins at step 130, where the wireless signal is received from the base station. The system 100 then proceeds to step 132, where a processor processes the wireless signal to perform frame synchronization. The system 100 then proceeds to step 134, where the processor processes the wireless signal to jointly estimate residual timing error and fractional frequency offset. The system then proceeds to step 136, where the processor processes the wireless signal to jointly detect integral frequency offset and sector identification and then the process ends.

Referring back to FIG. 1, steps 110-114 (e.g., coarse search for timing alignment, joint estimation of the RTE and the FFO, and joint detection of the IFO and the SID) are discussed hereinbelow, in greater detail.

In step 110, the system 100 of the present disclosure performs a coarse search for timing alignment, which includes downsampling of and application of a long-lag differential correlation to the received sample stream. The sample stream $\tilde{r}[q]$ can be downsampled by D times because the synchronization sequences occupy only the central $M_{SS}=72$: subcarriers, which occupy a bandwidth $$\frac{M_{SS}}{T},$$

even if their spectra are moved by a tolerable CFO $$\left(i.e., \pm \frac{5}{T}\right).$$

Hence, D can be chosen to be less than or equal to $$\left\lfloor \frac{N}{M_{SS}} \right\rfloor = 28$$

to ensure no essential loss on the received PSS, where $\lfloor \cdot \rfloor$ represents the floor operator that takes the greatest integer less than or equal to its argument. Downsampling can be implemented by a digital LPF with effective bandwidth $\pi/D$ whose impulse response ("IR") is denoted as $h_{lp}[q]$ followed by a D-point decimator. Therefore, the sample stream fed into the long-lag differential correlator can be written as $$r[l] = \hat{r}[lD] = \exp(j2\pi\rho_D l)\Sigma_{\nu=0}^2 \alpha_\nu s_\nu[l;\tau] + q[l], \quad l=0,1,\ldots,M-1, \quad (4)$$

where $\hat{r}[q] = \tilde{r}[q] * h_{lp}[q]$; * is the convolution operator; $T_D = DT_s$ is the sample period in the process; $\rho_D = \rho T_D$;

$$M = \left\lfloor \frac{N}{D} \right\rfloor;$$

$s_\nu[l] = \hat{s}_\nu[lD], \quad l=0,1,\ldots,M-1,$ $\hat{s}_\nu[q] = \tilde{s}_\nu[q] * h_{lp}[q], \quad q=0,1,\ldots;$ represent the decimation operation and the lowpass filtering process, respectively;

$w[l] = \hat{w}[lD], \quad l=0,1,\ldots,M-1,$ $\hat{w}[q] = \tilde{w}[q] * h_{lp}[q], \quad q=0,1,\ldots;$ and w[l] has variance $$\sigma_w^2 = N_0 B_D = \frac{\sigma_{\tilde{w}}^2}{D}, \quad B_D = \frac{1}{T_D}.$$

The differential correlator according to the present disclosure effectively overcomes the phase increment problem that occurs in the PN MF, discussed hereinabove. In accordance with the PN MF method, taking intercell interference into account, three banks of PN MFs, corresponding to $p_1[\cdot]$, $p_1[\cdot]$, and $p_2[\cdot]$, are required in a single timing alignment mechanism. However, it is not necessary that the sector search process accurately estimates $\alpha_0$, $\alpha_1$, and $\alpha_2$; only the maximum among $|\alpha_0|$, $|\alpha_1|$, and $|\alpha_2|$ suffices. The initial synchronizer need not resolve the PSS from the intercell interference, and the three banks of PN MFs are therefore unnecessary.

The coarse timing alignment of the present disclosure employs a differential correlator. It can extract the autocorrelation between two OFDM symbols that are separated by one half of a frame. The coarse timing alignment can thus be conducted based on the peak search of the autocorrelation evaluated at a long lag of $M_{HF}$, i.e., $$\Xi[l] = \frac{1}{M}\sum_{k=0}^{M-1} r[l-k]r^*[l - M_{HF} - k], \quad (5)$$

where the superscript * denotes the complex conjugate; $M_{HF} = \lfloor N_{slot} \cdot L_{slot}/D \rfloor$ is the number of samples within half a frame that is the separation of two identical PSSs; $N_{slot}=10$ is the number of slots in half a frame; $L_{slot}$ is the number of samples in a slot, which is $N_{symb}L_{symb}+16$; $L_{symb}$ is the number of samples in an OFDM symbol with a CP of length L=144, which is N+L; the length difference between the extended CP and the normal CP is 160−144=16; and $N_{symb}=7$ is the number of symbols in a slot. Coarse search of the PSS can be expressed as $\hat{\varsigma}=\mathrm{argmax}_l\{|\Xi[l]|^2\}$. From equation (5), $\Xi[l]$ can be rewritten as $$\Xi[l] = \Xi_{S\times S,1}[l] + \Xi_{S\times S,2}[l] + \Xi_{S\times N,1}[l] + \Xi_{S\times N,2}[l] + \Xi_{N\times N}[l], \quad (6)$$

where $$\Xi_{S\times S,1}[l] = e^{j2\pi v_D M_{HF}} \sum_{v=0}^{2} |\alpha_v|^2 \overline{R}_{vv}(\tau),$$

$$\overline{R}_{vv}(\tau) = \frac{1}{M}\sum_{k=0}^{M-1} s_v[l-k;\tau]s_v^*[l - M_{HF} - k; \tau];$$

$$\Xi_{S\times S,2}[l] = e^{j2\pi v_D M_{HF}} \sum_{u=0}^{2}\sum_{\substack{v=0 \\ v\neq u}}^{2} \alpha_u \alpha_v^* \overline{R}_{uv}(\tau),$$

$$\overline{R}_{uv}(\tau) = \frac{1}{M}\sum_{k=0}^{M-1} s_u[l-k;\tau]s_v^*[l - M_{HF} - k; \tau];$$

$$\Xi_{S\times N,1}[l] =$$

$$\frac{1}{M}\sum_{k=0}^{M-1}\left(\left(e^{j2\pi v_D(l-k)}\sum_{u=0}^{2}\alpha_u s_u[l-k;\tau]\right)\cdot w^*[l - M_{HF} - k]\right);$$

$$\Xi_{S\times N,2}[l] =$$

$$\frac{1}{M}\sum_{k=0}^{M-1}\left(w[l-k]\cdot\left(e^{j2\pi v_D(l-M_{HF}-k)}\cdot\sum_{v=0}^{2}\alpha_v s_v[l - M_{HF} - k;\tau]\right)^*\right);$$

$$\Xi_{N\times N}[l] = \frac{1}{M}\sum_{k=0}^{M-1} w[l-k]w^*[l - M_{HF} - k].$$

The first S×S term, $\Xi_{S\times S,1}[l]$, is the desired term to search for the location of peak autocorrelation. Thus, $\Xi_{S\times S,1}[l]$ dictates that the coarse timing alignment method of the present disclosure utilizes maximum ratio combining ("MRC") on multi-sector reception. The second S×S term, $\Xi_{S\times S,2}[l]$ is the self-interference term and is negligible at SNRs lower than 30 dB. At moderate SNRs, the two S×N terms, $\Xi_{S\times N,1}[l]$ and $\Xi_{S\times N,2}[l]$, dominate, and thus, the differential correlator suffers from a 3 dB degradation in SNR. At low SNRs, the N×N term, $\Xi_{N\times N}[l]$ dominates and the threshold effect occurs around SNR=0 dB.

With continuing reference to FIG. 1, after the PSS symbol is acquired and the frame structure can be roughly delineated, the system 10 proceeds to step 112, where the RTE and the FFO can be estimated by exploiting the short-lag autocorrelation. The autocorrelations extracted from all CPs in the half frame that is buffered in the above-mentioned long-lag differential correlator are averaged to achieve stable and accurate estimates of the common RTE and the common FFO with no extra delay. The short-lag differential correlator output can be expressed as $$\xi[q] = \frac{1}{N_{slot}}\sum_{m=0}^{N_{slot}-1}\frac{1}{N_{symb}}\sum_{n=0}^{N_{symb}-1} \quad (7)$$

$$\frac{1}{L}\sum_{l=0}^{L-1} \tilde{r}[(q-\xi D) + l + nL_{symb} + mL_{slot}]\cdot$$

$$\tilde{r}^*[(q-\xi D - N) + l + nL_{symb} + mL_{slot}].$$

In equation (7), 70 CPs are used to extract the autocorrelation at a fixed short lag N. $\xi[q]$ employs $\tilde{r}[q]$, instead of $r[l]$ it because all subchannels contribute to $\tilde{r}[q]$ and thus support the repetition property of $\tilde{r}[q]$ with CPs. Therefore, the RTE estimation based on $\xi[q]$ can be accurate to the level of a sample duration $T_s$. When searching for a peak magnitude of $\xi[q]$, the estimates of the common RTE and the common FFO can be evaluated as $$\hat{\iota} = \mathrm{argmax}_q\{|\xi[q]|^2\} \quad (8)$$

$$\hat{\varepsilon}_F = \frac{1}{2\pi}\angle\xi[\hat{\iota}] = \frac{1}{2\pi}\arctan\left(\frac{\mathcal{I}\{\xi[\hat{\iota}]\}}{\mathcal{R}\{\xi[\hat{\iota}]\}}\right),$$

where $\iota$ is the RTE $$\left[\frac{\tau - \xi T_D}{T_s}\right]_R,$$

$[\bullet]_R$ is the rounding operator, and $\hat{\iota}$ is the estimate of $\iota$; $\mathcal{R}\{\bullet\}$ and $\mathcal{I}\{\bullet\}$ denote the real and imaginary parts of their arguments, respectively; and $\varepsilon_F$ is the FFO and is within $$\left(-\frac{1}{2}, \frac{1}{2}\right]$$

because the principal range $(-\pi, \pi]$ is used for the arctan(•) function. The interference and noise can be significantly reduced by averaging over the 70 CPs. The coherence time of the fading channel can be evaluated as $$T_C = \sqrt{\frac{9}{16\pi f_m^2}} = 7.62 \text{ to } 0.762$$

ms for a mobile speed 30 to 300 km/h, where $f_m$ denotes the maximum Doppler frequency. The joint estimator of the present disclosure extracts the short-lag autocorrelations on a symbol-by-symbol basis during one half of an LTE frame (i.e., 5 ms), therefore exploiting time diversity. Because the employed CPs have been buffered in the coarse timing alignment subsystem, the moving-average filter does not lead to an additional delay. Furthermore, because the channel varies over time, the estimators can arrive at the stable, common estimates of the RTE and the FFO.

With continuing reference to FIG. 1, after the coarse timing alignment and the joint estimation of the RTE and the FFO are completed, the system 100 proceeds to step 114, where the PSS can be accurately found and the ICI mainly resulting from the FFO can be reduced significantly. The joint detection of the IFO and the SID can be carried out in the FD because the ZC sequences are arranged into the PSS subcarriers. An FD PN acquisition technique is used to estimate the IFO.

After $\varepsilon_F$ has been estimated and then compensated for in the preceding step, the IFO and the SID can be jointly detected by performing ZC acquisition on the ICI-free condition. The received signal is first transformed into the FD by an FFT. The resulting FD replica of the received PSS signal $\tilde{R}[\bullet]$ is used to perform cross-correlation with the three candidate ZC sequences by the corresponding FD PN MFs, i.e., $$\Psi_0[\Delta, v] = \sum_{\substack{k=-M_{SS}/2 \\ k \neq -\Delta}}^{M_{SS}/2-1} \tilde{R}[\{k+N\}_{/N}]P_v^*[\{k+\Delta+N\}_{/N}] \quad (9)$$

$$\Delta = -3, -2, \ldots, 3; v = 0, 1, 2,$$

where $\{x\}_{/N}$ denotes x modulo N; $\tilde{R}[k]$ is the kth subcarrier value of the N-point FFT of the FFO-compensated and timing-aligned replica of the received signal $\tilde{r}[q]$, i.e., $$\tilde{R}[k] = \frac{1}{\sqrt{N}} \sum_{q=0}^{N-1} \left(\tilde{r}[q-\xi D - \hat{\iota}] \cdot e^{-j2\pi\frac{c_F}{N}q}\right) e^{-j2\pi\frac{k}{N}q},$$

$$k = 0, 1, \ldots, N-1;$$

$\Delta$ is a shift of the subcarrier index; k is the subcarrier index; and subcarrier O is disabled. The joint detection of the IFO and the SID can be written as $$[\hat{\varepsilon}_{I;0} \quad \hat{v}_0]^T = \arg\max_{\substack{v \in \{0,1,2\} \\ \Delta \in \{-3,-2,\ldots,3\}}} |\Psi_0[\Delta, v]|^2, \quad (10)$$

where the superscript $(\bullet)^T$ denotes the vector transpose. The method mentioned above applies under a frequency flat assumption because the summation in equation (9) requires to coherently accumulate the products on a subcarrier-by-subcarrier basis.

In practice, frequency selective fading must be considered, and it may harm the aforementioned FD PN MF method because the FD PN MF accumulates cross-correlations that are weighted by the complex-valued frequency-selective channel fades. A differentially coherent detection technique can overcome the frequency selectivity and can therefore achieve lower probabilities of false-alarm and miss occurrences. Initially, the locally generated ZC sequence and $\tilde{R}[\bullet]$ are individually taken into the differential operation. The resulting sequences are then cross-correlated with each other. The FD PN MF based on the subcarrier-level differentially coherent detection can be written as $$\Psi_1[\Delta, v] = \sum_{\substack{k=-M_{SS}/2 \\ k \neq -\Delta-1, -\Delta}}^{M_{SS}/2-1} \left(\tilde{R}^*[\{k+N\}_{/N}]\tilde{R}[\{k+1+N\}_{/N}]\right) \cdot \quad (11)$$

$$(P_v^*[\{k+\Delta+N\}_{/N}]P_v[\{k+1+\Delta+N\}_{/N}])^*,$$

$$\Delta = -3, -2, \ldots, 3; v = 0, 1, 2.$$

The joint detection of the IFO and the SID can be written as $$[\hat{\varepsilon}_{I;1} \quad \hat{v}_1]^T = \arg\max_{\substack{v \in \{0,1,2\} \\ \Delta \in \{-3,-2,\ldots,3\}}} |\Psi_1[\Delta, v]|^2. \quad (12)$$

The above two-dimensional (2D) likelihood functions, $\Psi_0[\Delta, v]$ in (9) and $\Psi_1[\Delta, v]$ in equation (11), can be considered as two opposite extremes. $\Psi_0[\Delta, v]$ requires the channel to be as frequency flat as possible so that the cross-correlations can be accumulated coherently. Moreover, because $\Psi_0[\Delta, v]$ has the best noise suppression ability, the maximum-likelihood detection ("MLD") in equation (10) has the highest detection probability in a noise-dominant environment. On the other hand, $\Psi_1[\Delta, v]$ can deal with the worst frequency selectivity, but the detection performance of equation (12) would be significantly degraded by the heavy noise and non-negligible ICI inevitably resulting from Doppler spread. Between these two extremes, other 2D likelihood functions are available. First, the IR of the FD PN MFs can be segmented and piecewise cross-correlated with $\tilde{R}[\{k+N\}_{/N}]$ to generate partial correlations ("PARCORs"), in which each segment covers a few subchannels. Then, the segmental MF ("SMF") outputs, i.e., the extracted PARCORs, are fed to the FD differential correlator to exploit the frequency diversity, i.e., $$\Psi_2[\Delta, v] = \frac{1}{M_{SS}/S - 1} \sum_{l=-M_{SS}/2S}^{M_{SS}/2S-1} \psi_l^*[\Delta, v]\psi_{l+1}[\Delta, v], \quad (13)$$

$$\Delta = -3, -2, \ldots, 3; v = 0, 1, 2$$

where $$\psi_l[\Delta, v] = \frac{1}{S}\sum_{k=0}^{S-1} \tilde{R}[\{lS+k+N\}_{/N}]P_v^*[\{lS+k+\Delta+N\}_{/N}]$$

is the SMF output (i.e., the lth PARLOR) with S=2, 4, 8, 16 representing the SMF IR length. The joint detection of the IFO and the SID can be written as $$[\hat{\varepsilon}_{I;2} \quad \hat{v}_2]^T = \arg\max_{\substack{v \in \{0,1,2\} \\ \Delta \in \{-3,-2,\ldots,3\}}} |\Psi_2[\Delta, v]|^2. \quad (14)$$

When S=1, $\Psi_2[\Delta, v]$ degenerates to $\Psi_1[\Delta, v]$. The maximizations in equations (10), (12), and (14) can be readily conducted via grid search because only 21 possible choices are available.

Statistical evaluations were performed, which examined the coarse timing alignment and the joint RTE and FFO estimation in the presence of intercell interference.

The instantaneous SNR of the signal from sectors indexed by v can be expressed as $$\Gamma_v = |\alpha_v|^2 \frac{E_s}{N_0}, v = 0, 1, 2. \quad (16)$$

Because Rayleigh fading is assumed, $\Gamma_v$, v=0, 1, 2 are independent exponential RVs that have probability density functions ("PDFs") and cumulative distribution functions ("CDFs")

$$f_{\Gamma_v}(\gamma) = \frac{1}{\overline{\Gamma}_v}\exp\left(-\frac{\gamma}{\overline{\Gamma}_v}\right), \gamma \geq 0, v = 0, 1, 2, \quad (17)$$

and $$F_{\Gamma_v}(\gamma) = 1 - \exp\left(-\frac{\gamma}{\overline{\Gamma}_v}\right), \gamma \geq 0, v = 0, 1, 2,$$

respectively, where $\overline{\Gamma}_v$ represents the average of $\Gamma_v$. The instantaneous SNR of MRC reception, $\Gamma_{MRC} = \Sigma_{v=0}^2 \Gamma_v$, can be considered to be the sum of the three independent, non-identically distributed ("INID") exponential RVs. Using a moment-generating function ("MGF") method, the PDF and the CDF of $\Gamma_{MRC}$ can be formulated as $$f_{\Gamma_{MRC}}(\gamma) = \Sigma_{v=0}^2 c_v f_{\Gamma_v}(\gamma), \gamma \geq 0,$$

$$F_{\Gamma_{MRC}}(\gamma) = \Sigma_{v=0}^2 c_v F_{\Gamma_v}(\gamma), \gamma \geq 0, \quad (18)$$

where $$c_v = \prod_{\substack{l=0\\l\neq v}}^{2}\left(1 - \frac{\overline{\Gamma}_l}{\overline{\Gamma}_v}\right)^{-1}.$$

If $\alpha_0$, $\alpha_1$, and $\alpha_2$ have an identical distribution, equation (18) does not hold due to the region of convergence for the MGF. Under an independent and identically distributed (IID) condition, $\Gamma_{MRC}$ is a $\chi^2$ RV with six degrees of freedom (DoFs), i.e., $$f_{\Gamma_{MRC}}(\gamma) = \frac{3^3\gamma^2}{2!\overline{\Gamma}^3}\exp\left(-\frac{3\gamma}{\overline{\Gamma}}\right), \gamma \geq 0, \quad (19)$$

where (•) denotes the factorial operator and $\overline{\Gamma} = \Sigma_{v=0}^2 \overline{\Gamma}_v$. The IID assumption results in an equal power distribution across the multi-sector receptions. This configuration corresponds to the worst-case scenario in which the mobile station is located near a corner of three neighboring cells.

Because PSS acquisition cannot be completed when $\Gamma \leq \Gamma_{TH}$, the PSS acquisition process must be re-started. In the LTE specification, $\Gamma_{TH} = -6.4$ dB. The probability of a PSS being missed due to deep fades can be expressed as $$P_{MRC;Outage}(\overline{\Gamma}, \Gamma_{TH}) = \int_0^{\Gamma_{TH}} f_{\Gamma_{MRC}}(\gamma)d\gamma \quad (20)$$

$$= \begin{cases} \sum_{v=0}^{2} c_v F_{\Gamma_v}(\Gamma_{TH}), & INID \\ I\left(\frac{\sqrt{3}\Gamma_{TH}}{\overline{\Gamma}}, 2\right), & IID \end{cases},$$

where $$I(a, b) = \frac{1}{\Gamma(b+1)}\int_0^{a(b+1)^{1/2}} t^b e^{-t}dt$$

and $\Gamma(b) = \int_0^\infty t^{b-1}e^{-t}dt$ represent Pearson's incomplete gamma function and the gamma function, respectively [31]; $\overline{\Gamma} = [\overline{\Gamma}_0\overline{\Gamma}_1\overline{\Gamma}_2]^T$; and $\Gamma = [\Gamma_0\Gamma_1\Gamma_2]^T$. Thus, the PSS detection probability can be written as $$P_{MRC;Det}(\overline{\Gamma}, \Gamma_{TH}) = 1 - P_{MRC;Outage}(\overline{\Gamma}, \Gamma_{TH}). \quad (21)$$

A method of accounting for intercell interference with no exploitation of multi-sector diversity employs the highest correlator output and can be considered a selection combining ("SC") method. The instantaneous SNR of SC reception can be expressed as $$\Gamma_{SC} = \frac{E_s}{N_0}\max\{|\alpha_0|^2, |\alpha_1|^2, |\alpha_2|^2\}.$$

The CDF of $\Gamma_{SC}$ can be written as $F_{\Gamma_{SC}}(\gamma) = \text{Prob}[\{\Gamma_0 \leq \gamma, \Gamma_1 \leq \gamma m \; \Gamma_2 \leq \gamma\}] = \pi_{v=0}^2 F_{\Gamma_v}(\gamma)$. The PDF of $\Gamma_{SC}$ can be obtained by $$f_{\Gamma_{SC}}(\gamma) = \frac{d}{d\gamma}F_{\Gamma_{SC}}(\gamma).$$

Therefore, the outage probability and the PSS detection probability obtained using SC can be written as $$P_{SC;Outage}(\overline{\Gamma}, \Gamma_{TH}) = F_{\Gamma_{SC}}(\Gamma_{TH})$$

$$P_{SC;Det}(\overline{\Gamma}, \Gamma_{TH}) = 1 - P_{SC;Outage}(\overline{\Gamma}, \Gamma_{TH}). \quad (22)$$

Using step-by-step estimation, the RTE r is first estimated by considering the FFO and channel gains as nuisance parameters. Through the derivations in the appendix, the MCRLBs of the RTE estimations on MRC and SC receptions can be expressed as $$MCRLB_{MRC;\tau}(\overline{\Gamma}, \Gamma_{TH}) \geq \left(\frac{24\pi^2 B_{ms}}{P_{MRC;Det.}(\overline{\Gamma}, \Gamma_{TH})}\int_{\Gamma_{TH}}^\infty \gamma f_{\Gamma_{MRC}}(\gamma)d\gamma\right)^{-1} \quad (23)$$

$$MCRLB_{SC;\tau}(\overline{\Gamma}, \Gamma_{TH}) \geq \left(\frac{24\pi^2 B_{ms}}{P_{SC;Det.}(\overline{\Gamma}, \Gamma_{TH})}\int_{\Gamma_{TH}}^\infty \gamma f_{\Gamma_{SC}}(\gamma)d\gamma\right)^{-1} \quad (24)$$

where $$B_{ms} = \frac{1}{E_T}\int_{-\infty}^\infty f^2|S_v(f)|^2 df,$$

$v = 0, 1, 2$, denotes the mean-square (MS) bandwidth of the PSS signal $\tilde{s}_v(t)$;

$$E_T = \int_{-\infty}^\infty |S_v(f)|^2 df = \int_T |\tilde{s}_v(t)|^2 dt \approx T_D \Sigma_{l=0}^{M-1}|s_v[l]|^2 \approx T_S \Sigma_{q=0}^{N-1}|\tilde{s}_v[q]|^2; \text{ and}$$

$S_v(f) = \int_T \tilde{s}_v(t)e^{-j2\pi ft}dt$ is the Fourier transform of $sv(t), v = 0,1,2$.

The error variances of the FFO ρ estimations on MRC and SC receptions are bounded by $$MCRLB_{MRC;v}(\overline{\Gamma}, \Gamma_{TH}) \geq \left(\frac{24\pi^2 T_{ms}}{P_{MRC;Det.}(\overline{\Gamma}, \Gamma_{TH})}\int_{\Gamma_{TH}}^\infty \gamma f_{\Gamma_{MRC}}(\gamma)d\gamma\right)^{-1} \quad (25)$$

$$MCRLB_{SC;v}(\overline{\Gamma}, \Gamma_{TH}) \geq \left(\frac{24\pi^2 T_{ms}}{P_{SC;Det.}(\overline{\Gamma}, \Gamma_{TH})}\int_{\Gamma_{TH}}^\infty \gamma f_{\Gamma_{SC}}(\gamma)d\gamma\right)^{-1}, \quad (26)$$

where $$T_{ms} = \frac{1}{E_T} \int_{-\infty}^{\infty} t^2 |\tilde{s}_v(t)|^2 dt$$

is the MS duration of the PSS signal $\tilde{s}_v(t)$, v=0, 1, 2.

Software simulations were also conducted to verify the improvements achieved by the system of the present disclosure. The parameters employed herein are mainly obtained from the LTE specification. The Rayleigh fading channel is generated with Jakes' fading simulator, and the mobile speed is set to 30 and 300 km/h to test the proposed methods in frequency-selective and frequency-flat fading channels, respectively. A tapped-delay-line ("TDL") was also used to model the frequency-selective fading channel, and the tap-weighting coefficients are modeled with uncorrelated Jakes' Rayleigh faders. Four active propagation paths are equally separated over $96T_s$=3.125 μs, which is slightly shorter than a normal CP (i.e., $144T_s$), and all paths are of equal power. There are 97 taps in the TDL channel model, but only four tap-weighting coefficients are active. Thus, the root-mean-square ("rms") delay spread is $\sigma_\tau = 16\sqrt{5}T_s = 1.1646$ μs, and the coherence bandwidth can be calculated as $$B_{C,90\%} = \frac{1}{50\sigma_\tau} = \frac{N}{800\sqrt{5}} \frac{1}{T} \approx 1.1449 \frac{1}{T} \text{ to}$$

$$B_{C,50\%} = \frac{1}{5\sigma_\tau} = \frac{N}{80\sqrt{5}} \frac{1}{T} \approx 11.4487 \frac{1}{T}.$$

To simulate the intercell interference in practical environments, the three PSS signals are transmitted simultaneously with equal powers, and the signals individually propagate through mutually independent fading. This scenario models a mobile station experiencing a handover process at a corner among three adjacent cells. Meanwhile, all data subchannels are also occupied by random data, instead of being blank.

Only the central $M_{SS}$ subcarriers of the N total subcarriers are employed to transmit the PSS signals. The other subcarriers inevitably introduce interference and noise to the sector search process. Although an ideal LPF can effectively reject the interference and noise, its long IR may harm the accuracy of timing error estimation. A high-order LPF can effectively suppress the interference and noise with high hardware complexity. For system feasibility, a first-order IIR LPF is suggested here that has transfer function $$H_L(z) = \frac{1-\zeta}{1-\zeta z^{-1}}, \zeta = \exp\left(-2\pi \frac{M_{SS}}{N}\right). \quad (27)$$

After the LPF, the received signal can be downsampled by D times with no essential loss. Therefore, the coarse timing alignment can be performed at the lower sampling rate, which can significantly reduce the computational complexity.

Figure 5:
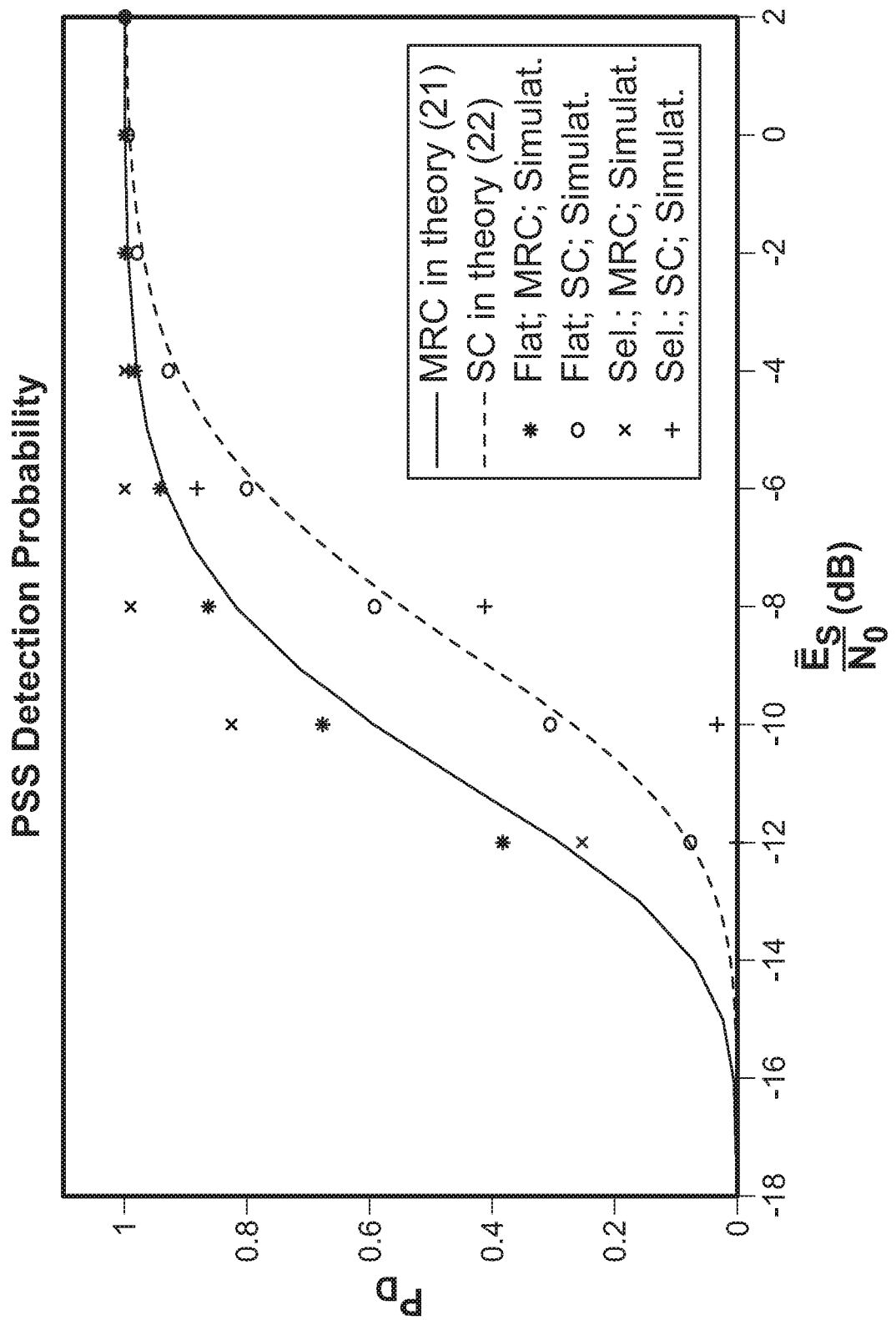

FIG. 5 illustrates the PSS detection probability on Rayleigh fading channels when the signals received from the three (3) sectors are of equal power. "Flat" stands for "frequency-flat fading" and "Sel." stands for "frequency-selective fading." FIG. 5 further illustrates the PSS detection probability versus the average SNR per sample $$\frac{E_s}{N_0}.$$

Combining the multi-sector signals via MRC reception can achieve higher probabilities of the PSS detection. The statistical analysis results (21) and (22) are also shown to serve as theoretical benchmarks. As can be seen in FIG. 5, the simulation results are close to the statistical analysis results. In addition, the proposed Technique with MRC outperforms the conventional technique with SC by roughly 10 $\log_{10}$ 3=4.7712 dB in SNR. The proposed technique extracts autocorrelations on signals coming from different cells by means of the long-lag differential correlator, thereby, exploiting the multi-sector diversity.

Figure 6:
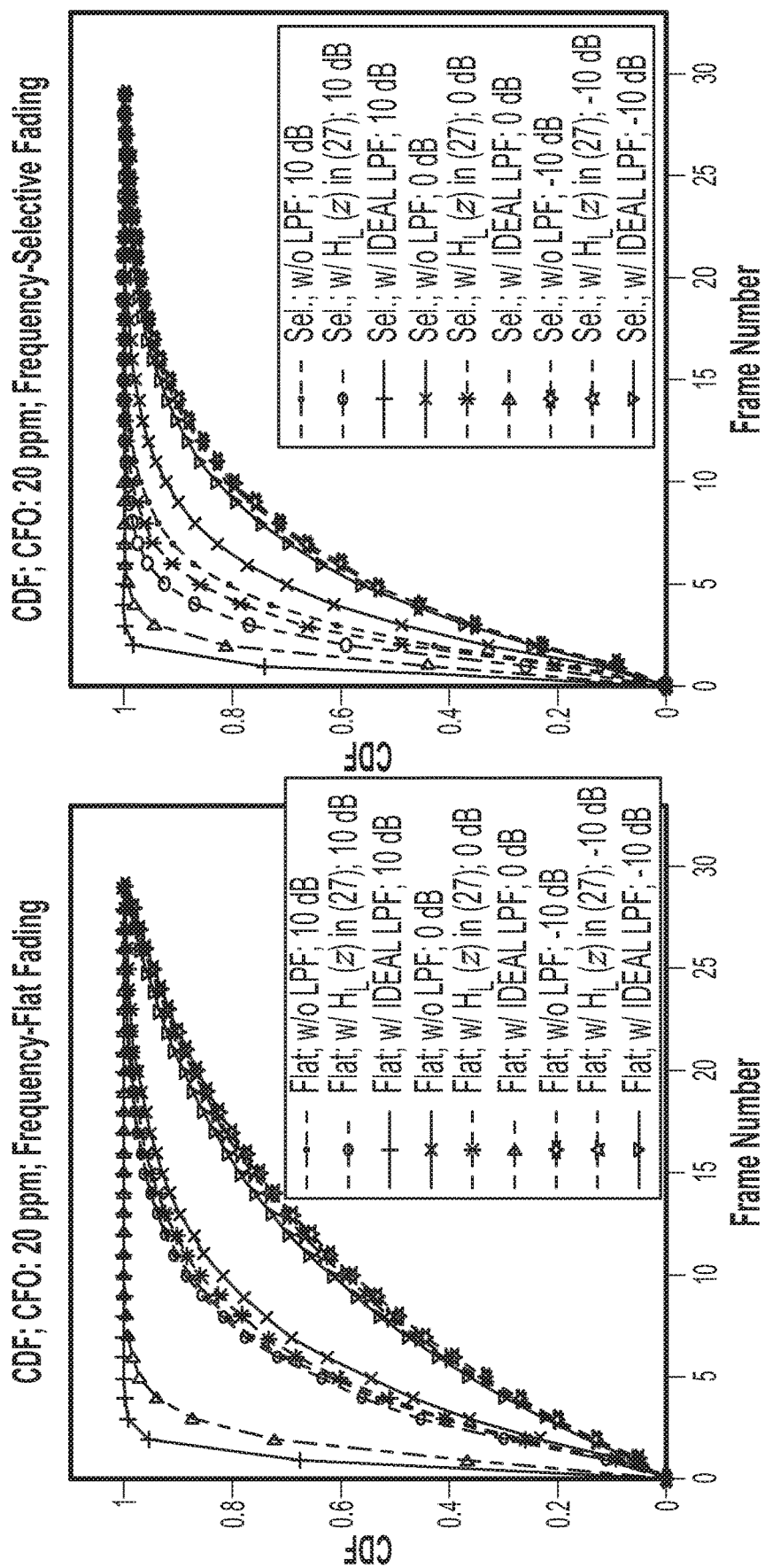

FIG. 6 illustrates the CDFs of a sector search success versus the required number of frames for various SNRs. From FIG. 5, it can be easily seen that the sector search can be completed faster (1) for higher SNRs, (2) with exploitation of the LPFs to suppress the out-of-band interference and noise, or (3) in multipath environments because of the inherent frequency diversity; the CDFs obtained using the ideal LPF and $H_L(2)$ in equation (27) are close, and the ideal LPF and $H_L(z)$ in (27) have similar abilities to save time during the coarse timing alignment by effectively reducing the interference and the noise; and finally, the proposed technique achieves a success rate of over 80% of the PSS acquisition with timing errors smaller than a normal CP length in approximately 160 ms, even when strong intercell interference exists, $$\frac{E_s}{N_0} = -10$$

dB and $\sigma_T$=1.1646 μs.

Figure 7:
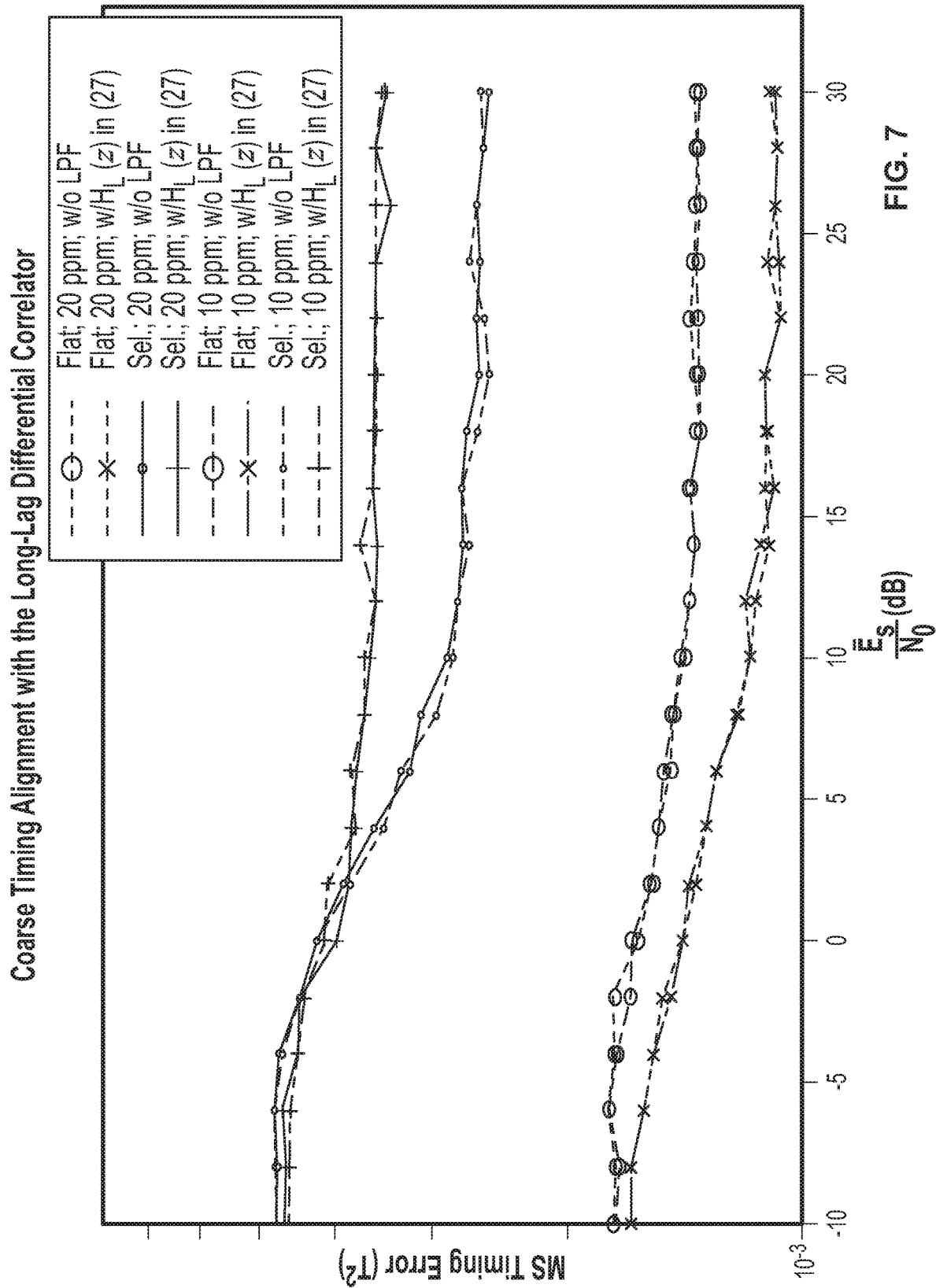

FIG. 7 illustrates MS timing errors obtained using the coarse timing alignment for Rayleigh fading channels. An initial CFO of 10 or 20 ppm of the carrier frequency is on the level of a few subcarrier spacings, thus, destroying a timing error estimator based on PN MF with IR as long as T. The initial CFO of 10 or 20 ppm of $f_c$ does not change the MS timing errors significantly. This means that the long-lag differential correlator has high resistance to CFO. The coarse timing alignment of the present disclosure can achieve sufficiently low timing errors on the level of a few samples, which is significantly shorter than a CP. Thus, the joint RTE and FFO estimator can begin to work. It is also observed that $H_L(z)$ in equation (27) can effectively reduce the interference and noise coming from the data subcarriers with significant reduction of hardware complexity.

Figure 8:
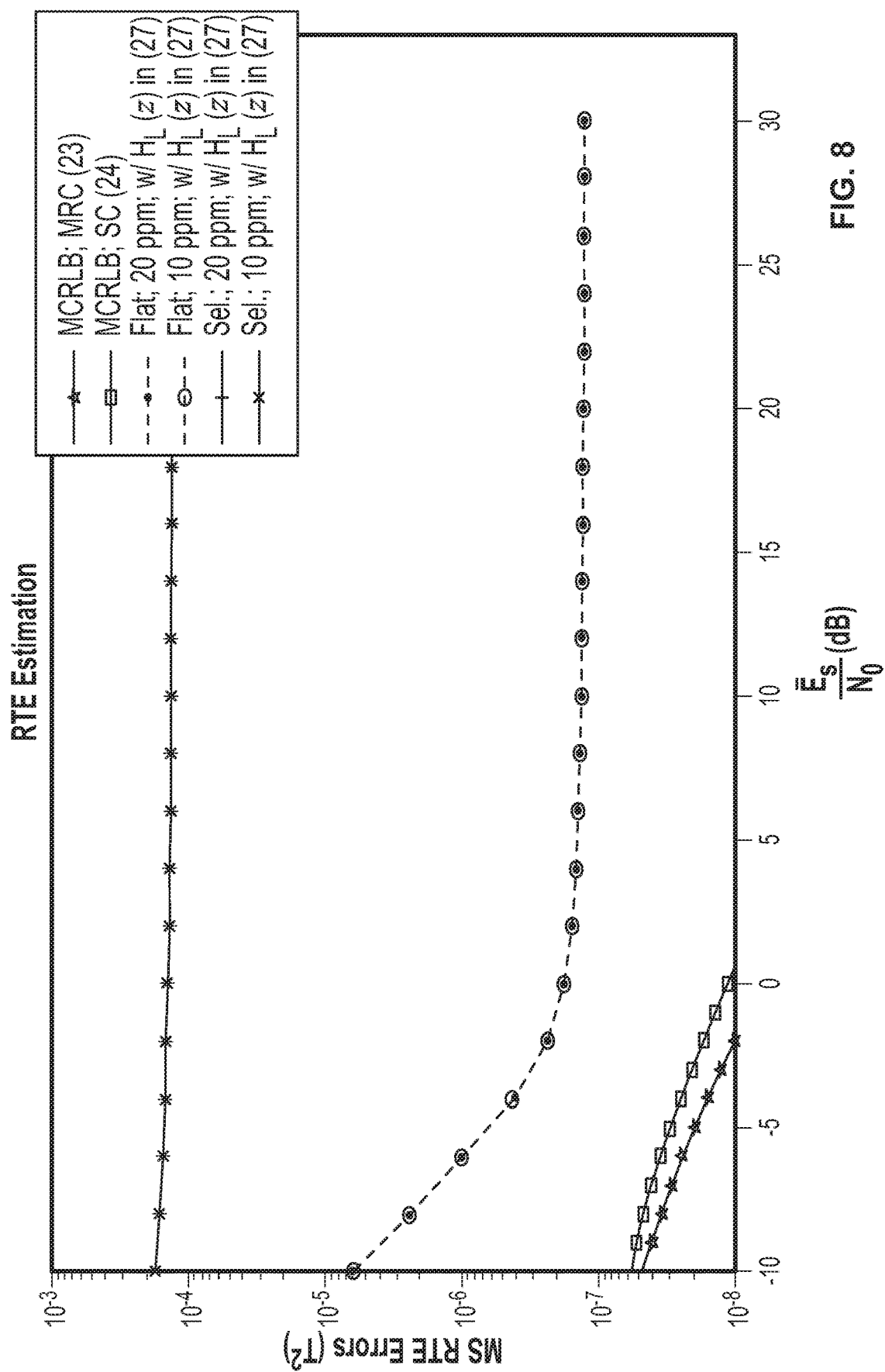
Figure 9:
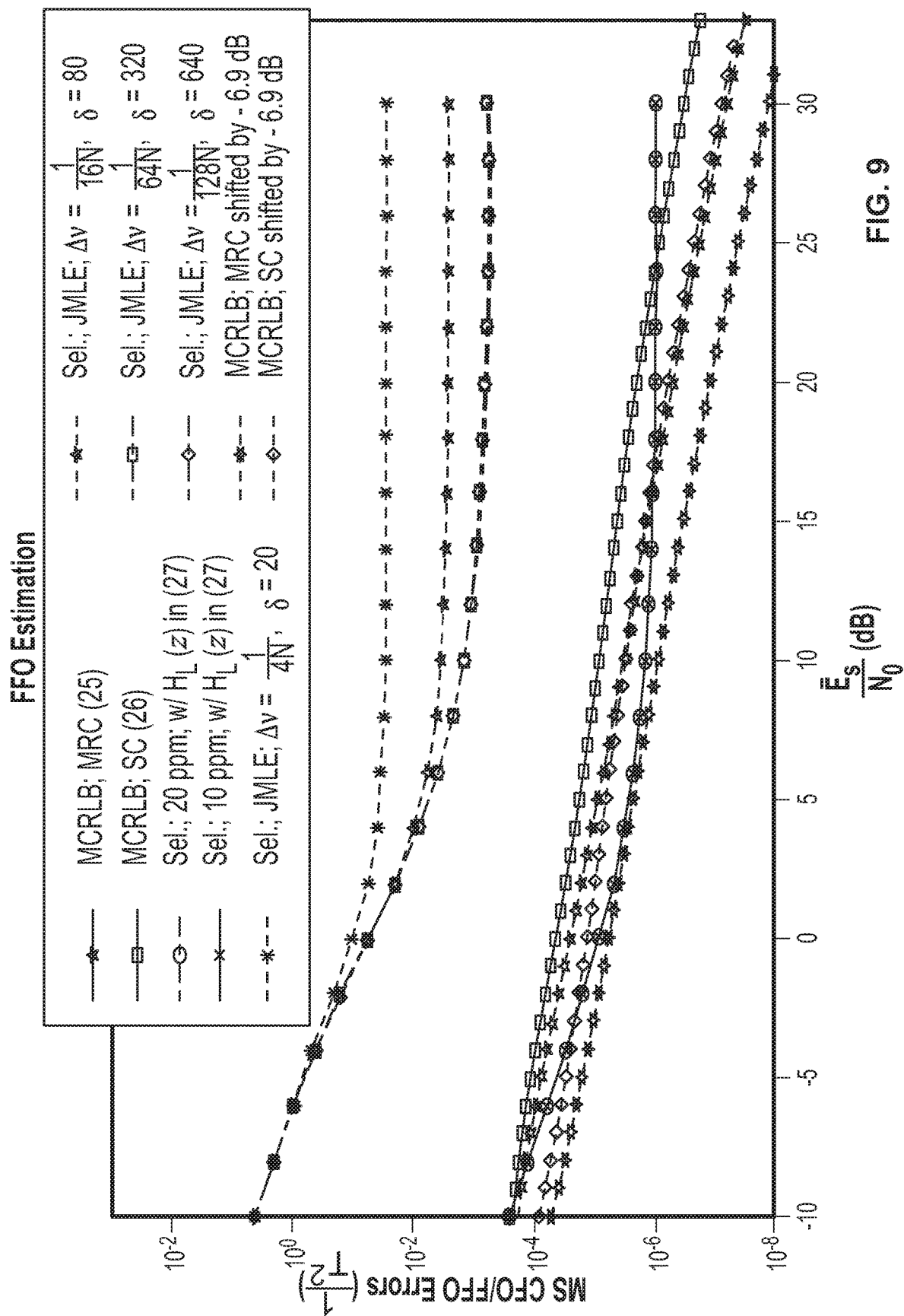

FIGS. 8 and 9 illustrate the MS errors of the joint estimation of the RTE and the FFO, respectively, obtained using the short-lag differential correlator. The following observations can be made from these figures: (1) an initial CFO of either 20 or 10 ppm of the carrier frequency does not significantly change the estimation performance (this implies that the short-lag differential correlator has high resistance to CFO); (2) time-varying multipath fading results in interference and thus leads to high error floors for the estimation of the RTE and the FFO; and (3) the joint estimator disclosed herein can achieve sufficiently low FFO estimation error, thus reducing the ICI.

The MCRLBs obtained using the MRC and the SC methods are also demonstrated in FIG. 9 to serve as operational references instead of performance bounds; additionally, equations (23), (24), (25), and (26) were derived for the scenario in which a single PSS signal is transmitted as a training sequence to conduct timing error and frequency offset estimation, and thus, the multi-sector and multipath diversity combining techniques are perfectly accomplished. Although the JMLE actually exploits a single PSS signal to estimate the CFO, multipath reception and multi-sector diversity are not accomplished effectively. The joint RTE and FFO estimator disclosed herein exploits 70 CPs to leverage the time diversity caused by the time variations of the channel fades, to effectively suppress the interference and noise, and to exploit the inherent multipath diversity; as a result, lower MS errors are achieved. Because the 70 CPs contain 70×144 samples and a PSS signal constitutes 2048 samples, the joint estimation of the RTE and the FFO can gain a $10 \log_{10}(70 \times 144/2048) = 6.9213$-dB SNR advantage through the suppression of interference and noise by the moving averager.

With further reference to FIG. 9, if the curves of equations (25) and (26), i.e., the solid curves labeled with pentagons and squares, are moved in the negative direction by 6.9213 dB, the two dotted curves labeled with hexagons and diamonds can be obtained to serve effectively as a lower bound on the FFO estimation error. Because the channel varies over time with a coherence time $T_C=0.762$ to 7.62 ms and the short-lag differential correlator extracts the autocorrelation from 70 OFDM symbols, the time diversity is therefore exploited by the system of the present disclosure.

FIGS. 10 and 11 illustrate the IFO and the SID detection probabilities for frequency-selective fading channels, respectively. The following observations can be made from these figures: (1) the system of the present disclosure exploiting either coherent detection or subcarrier-level differentially coherent detection can achieve high IFO and SID detection probabilities even when the mobile station is located at a corner among three cells; and (2) the differential correlator assisted by the SMFs could achieve higher IFO and SID detection probabilities for the frequency-selective fading channel. Even if the rms delay spread is as high as $\sigma_\tau = 1.1646$ μs (i.e., the multipath delays are spread over $96T_g$) the 50% coherence bandwidth of the frequency-selective fading channel covers more than 10 subcarriers, and thus, the frequency selectivity is not significant. Therefore, differentially coherent detection with SMFs covering approximately 10 subcarriers can achieve the highest IFO and SID detection probabilities. This means that differentially coherent detection with SMFs actually exploit the frequency diversity.

Accordingly, what is disclosed herein is a system and method for performing initial synchronization during wireless sector searches. Disclosed methods include utilization of autocorrelation, cyclic-extension correlation, and differential cross-correlation to acquire the symbol timing, the frequency offset, and the SID. The system and method of the present disclosure effectively addresses frequency selectivity, time selectivity, and intercell interference. The system and method of the present disclosure can also reduce computational/hardware complexity by effective lowpass filtering and downsampling. Simulation results in conjunction with derivations of the PSS detection probability and MCRLBs have been presented to demonstrate the improvements achieved using the disclosed system and method. The system and method of the present disclosure inherently exploits the multi-sector diversity, the time diversity, and the frequency diversity.

MCRLBs of the RTE and CFO Estimation are provided hereinbelow for reference:

From equation (4), the conditional LLF of $\Theta_D=[\tau \rho_D]^T$ can be formulated as $$\Lambda_{L,D}(\Theta_D) = \log p(r \mid \Theta_N; \Theta_D) \tag{28}$$

$$= -\frac{1}{\sigma_w^2} \sum_{l=1}^{M-1} \left| r[l] - e^{j2\pi \rho_D l} \sum_{v=0}^{2} \alpha_v s_v[l; \tau] \right|^2,$$

where $\Theta_N=[\alpha_0 \alpha_1 \alpha_2]^T$ denotes the nuisance parameter. The second partial derivative of $\Lambda_{L,D}(\Theta_n)$ with respect to $\tau$ can be written as $$\frac{\partial^2}{\partial \tau^2} \Lambda_{L,D}(\Theta_D) = -\frac{2}{\sigma_w^2} \sum_{l=0}^{M-1} \mathcal{R}\left\{ e^{j2\pi \rho_D l} \sum_{v=0}^{2} \alpha_v \left( -\frac{\partial^2}{\partial \tau^2} s_v[l; \tau] \right) \right. \tag{29}$$

$$\left( r[l] - e^{j2\pi \rho_D l} \sum_{u=0}^{2} \alpha_u s_u[l; \tau] \right)^* +$$

$$\left( e^{j2\pi \rho_D l} \sum_{v=0}^{2} \alpha_v \left( \frac{\partial}{\partial \tau} s_v[l; \tau] \right) \right) \cdot$$

$$\left. \left( e^{j2\pi \rho_D l} \sum_{u=0}^{2} \alpha_u \left( \frac{\partial}{\partial \tau} s_u[l; \tau] \right) \right)^* \right\}.$$

Element $I_{1,1}$ of the Fisher information matrix ("FIM") $I(\Theta_D)$ can be found as $$I_{1,1} = -E\left\{ \frac{\partial^2}{\partial \tau^2} \Lambda_{L,D}(\Theta_D) \right\} \tag{30}$$

$$= \frac{2}{\sigma_w^2} \sum_{l=0}^{M-1} \left| \sum_{v=0}^{2} \alpha_v \left( \frac{\partial}{\partial \tau} s_v[l; \tau] \right) \right|^2.$$

In accordance with the Cauchy-Schwarz Inequality, $$I_{1,1} \leq \frac{2}{\sigma_w^2} \sum_{l=0}^{M-1} \left( \sum_{u=0}^{2} |\alpha_u|^2 \sum_{v=0}^{2} \left| \frac{\partial}{\partial \tau} s_v[l; \tau] \right|^2 \right) \approx \tag{31}$$

$$\frac{2B_D}{\sigma_w^2} \sum_{u=0}^{2} |\alpha_u|^2 \sum_{v=0}^{2} \int_T \left| \frac{\partial}{\partial \tau} \tilde{s}_v(t-\tau) \right|^2 dt,$$

where $$\int_T \left| \frac{\partial}{\partial \tau} \tilde{s}_v(t-\tau) \right|^2 dt =$$

$$\int_{-\infty}^{\infty} |j2\pi f S_v(f)|^2 df = 4\pi^2 \int_{-\infty}^{\infty} f^2 |S_v(f)|^2 df = 4\pi^2 B_{ms} E_T.$$

Because $\sigma_w^2 = N_0 B_D$, (31) can be rewritten as $$I_{1,1} \leq 24\pi^2 B_{ms} \left( \frac{E_T}{N_0} \sum_{v=0}^{2} |\alpha_v|^2 \right).$$

Because $MCRLB_{MRC;\tau}(\Gamma, \Gamma_{TH}) \geq (E\{24\pi^2 B_{ms} \Gamma_{MRC} |$
$\Gamma_{MRC} \geq \Gamma_{TH}\})^{-1}$ $MCRLB_{SC;\tau}(\Gamma, \Gamma_{TH}) \geq (E\{24\pi^2 B_{ms} \Gamma_{SC} | \Gamma_{SC} \geq \Gamma_{TH}\})^{-1}$, equations (23) and (24) can be obtained.

Suppose that the timing error estimation is completed and that the timing error can be significantly reduced; then, the LLF of $\rho_D$ can be modified from equation (28) and written as $$\Lambda_{L,1}(\nu_D) = -\frac{1}{\sigma_w^2}\sum_{l=0}^{M-1}\left|r'[l] - \exp(j2\pi\rho_D l)\sum_{v=0}^{2}\alpha_v s_v[l]\right|^2,$$

where r'[l] is the timing-error-free replica of r[l]. By taking twice partial derivatives of $\Lambda_{L,1}(\rho_D)$ with respect to $\rho_D$, we have $$\frac{\partial^2}{\partial \rho_D^2}\Lambda_{L,1}(\rho_D) = -\frac{2}{\sigma_w^2}\sum_{l=0}^{M-1}\mathcal{R} \quad (32)$$

$$\left\{(2\pi l)^2 e^{j2\pi\rho_D l}\sum_{v=0}^{2}\alpha_v s_v[l] \cdot \left(r'[l] - e^{j2\pi\rho_D l}\sum_{u=0}^{2}\alpha_u s_u[l]\right)^* + \right.$$

$$\left(-j2\pi l e^{j2\pi\rho_D l}\sum_{v=0}^{2}\alpha_v s_v[l]\right) \cdot$$

$$\left.\left(-j2\pi l e^{j2\pi\rho_D l}\sum_{u=0}^{2}\alpha_u s_u[l]\right)^*\right\}.$$

The Fisher information of $\rho_D$ can be written as $$J = -E\left\{\frac{\partial^2}{\partial \rho_D^2}\Lambda_{L,1}(\rho_D)\right\} = \frac{8\pi^2}{\sigma_w^2}\sum_{l=0}^{M-1}l^2\left|\sum_{v=0}^{2}\alpha_v s_v[l]\right|^2 \leq \quad (33)$$

$$\frac{8\pi^2}{\sigma_w^2}\sum_{l=0}^{M-1}l^2\left(\sum_{u=0}^{2}|\alpha_u|^2\sum_{v=0}^{2}|s_v[l]|^2\right) \approx$$

$$\frac{8\pi^2}{N_0}\cdot\frac{1}{T_D^2}\sum_{u=0}^{2}|\alpha_u|^2 \cdot \sum_{v=0}^{2}\int_0^T t^2|\tilde{s}_v(t)|^2 dt,$$

where $\int_T t^2|\tilde{s}_v(t)|^2 dt = T_{ms}E_T$, v=0, 1, 2, As a result, (33) can be rewritten as $$J \leq \frac{1}{T_D^2}\cdot 24\pi^2 T_{ms}\left(\frac{E_T}{N_0}\sum_{v=0}^{2}|\alpha_v|^2\right).$$

The frequency offset $\rho_D$ is estimated by considering the channel gains as nuisance parameters. As a result, the MCRLBs of the frequency offset estimation derived for MRC and SC receptions can be expressed as $$MCRLB_{MRC;\rho_D}(\Gamma, \Gamma_{TH}) \geq \quad (34)$$

$$\left(\frac{24\pi^2 T_{ms}}{T_D^2 P_{MRC;Det.}(\Gamma, \Gamma_{TH})}\int_{\Gamma_{TH}}^{\infty}\gamma f_{\Gamma_{MRC}}(\gamma)d\gamma\right)^{-1}$$

$$MCRLB_{SC;\rho_D}(\Gamma, \Gamma_{TH}) \geq \left(\frac{24\pi^2 T_{ms}}{T_D^2 P_{SC;Det.}(\Gamma, \Gamma_{TH})}\int_{\Gamma_{TH}}^{\infty}\gamma f_{\Gamma_{SC}}(\gamma)d\gamma\right)^{-1}. \quad (35)$$

Because $\rho = \frac{\rho_D}{T_D}$, $$MCRLB_{MRC;\rho}(\Gamma, \Gamma_{TH}) = \frac{1}{T_D^2}MCRLB_{MRC;\rho_D}(\Gamma, \Gamma_{TH}) \text{ and}$$

$$MCRLB_{SC;\rho}(\Gamma, \Gamma_{TH}) = \frac{1}{T_D^2}MCRLB_{SC;\rho_D}(\Gamma, \Gamma_{TH}).$$

Thus, (25) and (26) can be obtained.

Having thus described the invention in detail, it is to be understood that the foregoing description is not intended to limit the spirit or scope thereof. What is desired to be protected is set forth in the following claims.

What is claimed is:

1. A system for performing initial synchronization during wireless sector searching, comprising:
   a mobile device in wireless communication with at least one base station;
   a receiver in said mobile device for receiving a wireless signal from the at least one base station; and
   a processor in communication with said receiver, said processor programmed to:
   process the wireless signal during a sector search process to perform a frame synchronization;
   process the wireless signal during the sector search process to jointly estimate a residual timing error;
   process the wireless signal during the sector search process to jointly estimate a fractional frequency offset; and
   process the wireless signal during the sector search process to jointly detect an integral frequency offset and identify a sector identification.

2. The system of claim 1, wherein the processor processes the wireless signal to perform the frame synchronization using a long-lag differential correlator.

3. The system of claim 2, wherein the processor processes the wireless signal to perform the frame synchronization using a decimator to reduce computational complexity.

4. The system of claim 3, wherein the processor processes inter-sector diversity information to perform the frame synchronization.

5. The system of claim 1, wherein the processor processes the wireless signal to jointly estimate the residual timing error using a short-lag differential correlator.

6. The system of claim 5, wherein the processor processes time diversity information to jointly estimate the residual timing error.

7. The system of claim 1, wherein the processor processes the wireless signal to jointly estimate the fractional frequency offset using a short-lag differential correlator.

8. The system of claim 7, wherein the processor processes time diversity information to jointly estimate the fractional frequency offset.

9. The system of claim 1, wherein the processor processes the wireless signal to jointly detect the integral frequency offset and identify the sector identification using a frequency-domain matched filter.

10. The system of claim 9, wherein the processor processes frequency diversity information to jointly detect the integral frequency offset and identify the sector identification.

11. The system of claim 1, wherein the wireless signal conforms to the long-term evolution (LTE) or LTE-A communications standards.

12. The system of claim 1, wherein the processor compensates for inter-cell interference, inter-carrier interference, and multipath fading.

13. A method for performing initial synchronization during wireless section searching, comprising the steps of:
   receiving at a mobile device a wireless signal transmitted to the mobile device from at least one base station;
   processing the wireless signal using a processor in the mobile device to perform a frame synchronization during a wireless sector search process;
   processing the wireless signal using the processor to jointly estimate a residual timing error during the wireless sector search process;
   processing the wireless signal using the processor to jointly estimate a fractional frequency offset during the wireless sector search process; and processing the wireless signal using the processor to jointly detect an integral frequency offset and identify a sector identification during the wireless sector search process.

14. The method of claim 13, wherein the step of processing the wireless signal to perform the frame synchronization comprises processing the wireless signal to perform the frame synchronization using a long-lag differential correlator.

15. The method of claim 14, wherein the step of processing the wireless signal to perform the frame synchronization comprises processing the wireless signal to perform the frame synchronization using a decimator to reduce computational complexity.

16. The method of claim 15, wherein the step of processing the wireless signal to perform the frame synchronization comprises processing inter-sector diversity information to perform the frame synchronization.

17. The method of claim 13, wherein the step of processing the wireless signal to jointly estimate the residual timing error comprises processing the wireless signal to jointly estimate the residual timing error using a short-lag differential correlator.

18. The method of claim 17, wherein the step of processing the wireless signal to jointly estimate the residual timing error comprises processing time diversity information to jointly estimate the residual timing error.

19. The method of claim 13, wherein the step of processing the wireless signal to jointly estimate the fractional frequency offset comprises processing the wireless signal to jointly estimate the fractional frequency offset using a short-lag differential correlator.

20. The method of claim 19, wherein the step of processing the wireless signal to jointly estimate the fractional frequency offset comprises processing time diversity information to jointly estimate the fractional frequency offset.

21. The method of claim 13, wherein the step of processing the wireless signal to jointly detect the integral frequency offset and identify the sector identification comprises processing the wireless signal to jointly detect the integral frequency offset and identify the sector identification using a frequency-domain matched filter.

22. The method of claim 21, wherein the step of processing the wireless signal to jointly detect the integral frequency offset and identify the sector identification comprises processing frequency diversity information to jointly detect the integral frequency offset and identify the sector identification.

23. The method of claim 13, wherein the wireless signal conforms to the long-term evolution (LTE) or LTE-A communications standards.

24. The method of claim 13, further comprising the step of processing the wireless signal using the processor to compensate for inter-cell interference, inter-carrier interference, and multipath fading.

* * * * *